US012775501B2

(12) United States Patent
Gowda et al.

(10) Patent No.: US 12,775,501 B2
(45) Date of Patent: Oct. 27, 2026

(54) LOGICALLY COMPOSED SYSTEM (LCS) WORKLOAD IN-BAND RESOURCE DEVICE MANAGEMENT SYSTEM PROVIDING RESOURCE ALLOCATION USING A RESOURCE FILE HIERARCHY

(71) Applicant: Dell Products L.P., Round Rock, TX (US)

(72) Inventors: Srinivas Giri Raju Gowda, Santa Clara, CA (US); Shyamkumar T. Iyer, Cedar Park, TX (US); Gaurav Chawla, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1158 days.

(21) Appl. No.: 17/836,329

(22) Filed: Jun. 9, 2022

(65) Prior Publication Data

US 2023/0401100 A1 Dec. 14, 2023

(51) Int. Cl.
*G06F 9/50* (2006.01)

(52) U.S. Cl.
CPC ............ *G06F 9/505* (2013.01); *G06F 9/5033* (2013.01); *G06F 9/5077* (2013.01); *G06F 9/5083* (2013.01); *G06F 2209/503* (2013.01)

(58) Field of Classification Search
None
See application file for complete search history.

(56) References Cited

U.S. PATENT DOCUMENTS

| | | | | |
|---|---|---|---|---|
| 10,262,390 | B1 * | 4/2019 | Sun | G06F 9/5077 |
| 11,212,237 | B1 * | 12/2021 | Sanghai | H04L 67/55 |
| 11,711,314 | B1 * | 7/2023 | Nalam | H04L 47/781 709/226 |
| 2016/0337084 | A1 * | 11/2016 | Wen | H04L 41/0654 |
| 2019/0034237 | A1 * | 1/2019 | Siddappa | H04L 67/1012 |
| 2019/0266011 | A1 * | 8/2019 | Fang | G06F 9/485 |
| 2021/0409270 | A1 | 12/2021 | Bursell | |
| 2022/0182439 | A1 * | 6/2022 | Zhou | G06F 9/542 |

* cited by examiner

*Primary Examiner* — Zujia Xu
(74) *Attorney, Agent, or Firm* — Joseph Mencher

(57) ABSTRACT

A Logically Composed System (LCS) workload in-band resource device management system includes a resource device management subsystem coupled to a workload that is provided using an LCS, and to a System Control Processor (SCP) device. The resource device management subsystem determines a first plurality of resource devices that are available via the SCP device for the LCS, and presents an available-resource file hierarchy to the workload that identifies the first plurality of resource devices. When the resource device management subsystem receives a resource device request from the workload for a first resource device that is included in the first plurality of resource devices identified in the available-resource file hierarchy, it provides a resource device provisioning request to the SCP device that is configured to cause the SCP device to provide the first resource device to the LCS for utilization by the workload.

20 Claims, 16 Drawing Sheets

800

LOGICALLY COMPOSED SYSTEM (LCS) WORKLOAD IN-BAND RESOURCE DEVICE MANAGEMENT SYSTEM PROVIDING RESOURCE ALLOCATION USING A RESOURCE FILE HIERARCHY

BACKGROUND

The present disclosure relates generally to information handling systems, and more particularly to in-band management of resource devices by workloads running on Logically Composed System(s) provided using information handling systems.

As the value and use of information continue to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

While conventional information handling systems such as, for example, server devices and/or other computing devices known in the art have traditionally been provided with particular information handling systems components that configure them to satisfy one or more use cases, new computing paradigms provide for the allocation of resources from information handling systems and/or information handling system components for use in Logically Composed Systems (LCSs) that may be composed as needed to satisfy any computing intent/workload, and then decomposed such that those resources may be utilized in other LCSs. As such, users of the LCSs may be provided with LCSs that meet their current needs for any particular workload they require.

For example, an LCS may be provided using a resource system such as a Bare Metal Server (BMS) system, with a processing system and memory system in the BMS system used to provide an Operating System (OS) for the LCS, and resource devices included in that BMS system and/or outside of that BMS system provided for use by a workload provided by the OS and/or other applications. For example, conventional LCS systems may be "composed" by a resource management system based on a "computing intent" expressed by a user, with the resource management system operating to provide the LCS using resource device(s) that may then be utilized by its workloads, which can raise some issues. For example, workloads may have dynamic resource requirements, but workloads are not configured to perform "out-of-band" communications with the resource management system, and thus do not have the ability to discover, modify, or otherwise manage resource devices provided to their LCS. As such, conventional LCSs are limited following their composition, and thus may provide for inefficient performance by a workload for which they were composed, particularly when the resource requirements for that workload change.

Accordingly, it would be desirable to provide an LCS workload in-band resource device management system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a resource device management engine that is configured to: determine a first plurality of resource devices that are available via a System Control Processor (SCP) device for a Logically Composed System (LCS); present, to a workload provided using the LCS, an available-resource file hierarchy that identifies the first plurality of resource devices; receive, from the workload, a resource device request for a first resource device that is included in the first plurality of resource devices identified in the available-resource file hierarchy; and provide, to the SCP device, a resource device provisioning request that is configured to cause the SCP device to provide the first resource device to the LCS for utilization by the workload.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen, and/or a video display. The information handling system may also include one or more buses operable to transmit communications between the various hardware components.

Figure 1:
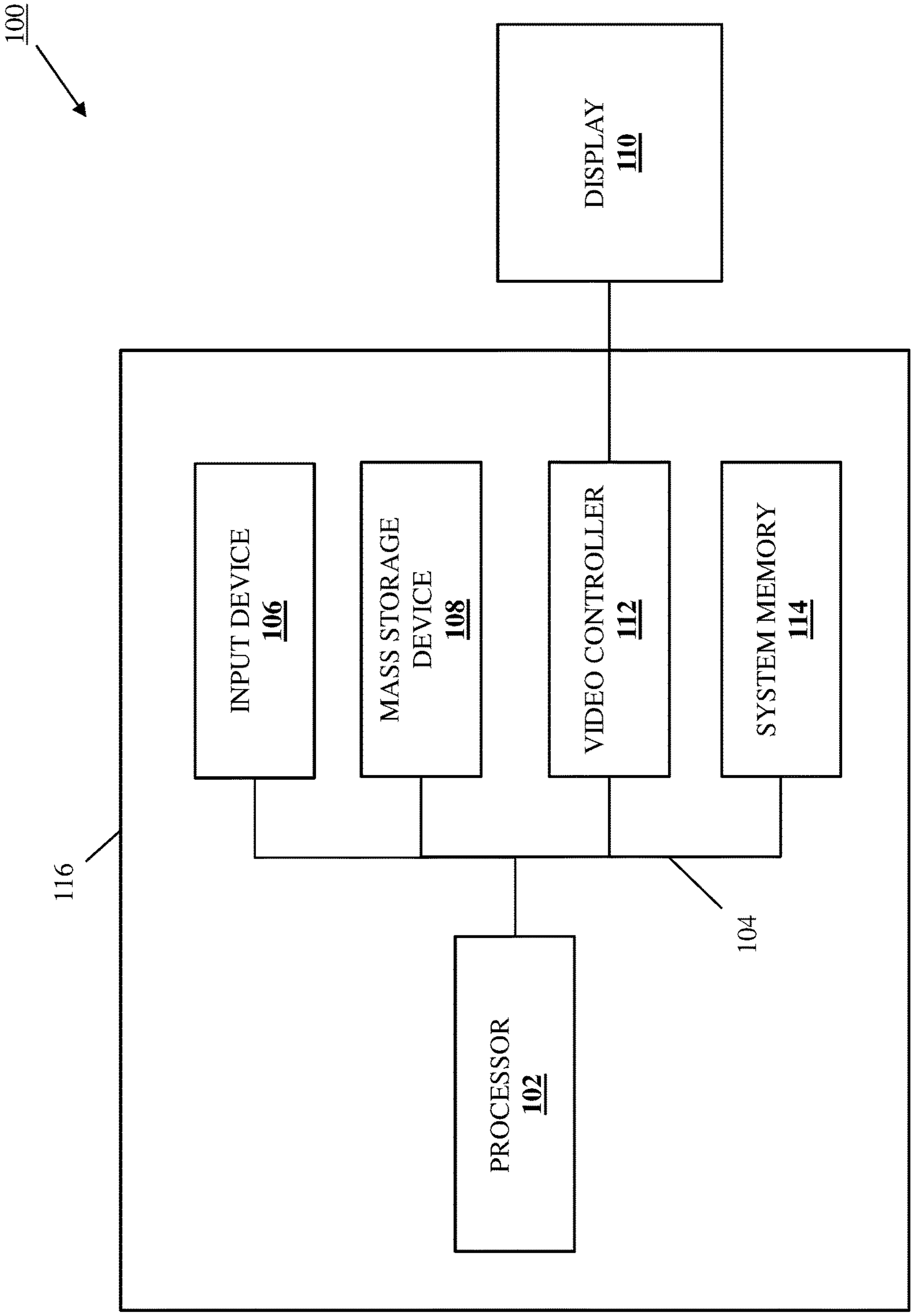
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

As discussed in further detail below, the Logically Composed System (LCS) workload in-band resource device management systems and methods of the present disclosure may be utilized with Logically Composed Systems (LCSs), which one of skill in the art in possession of the present disclosure will recognize may be provided to users as part of an intent-based, as-a-Service delivery platform that enables multi-cloud computing while keeping the corresponding infrastructure that is utilized to do so "invisible" to the user in order to, for example, simplify the user/workload performance experience. As such, the LCSs discussed herein enable relatively rapid utilization of technology from a relatively broader resource pool, optimize the allocation of resources to workloads to provide improved scalability and efficiency, enable seamless introduction of new technologies and value-add services, and/or provide a variety of other benefits that would be apparent to one of skill in the art in possession of the present disclosure.

Figure 2:
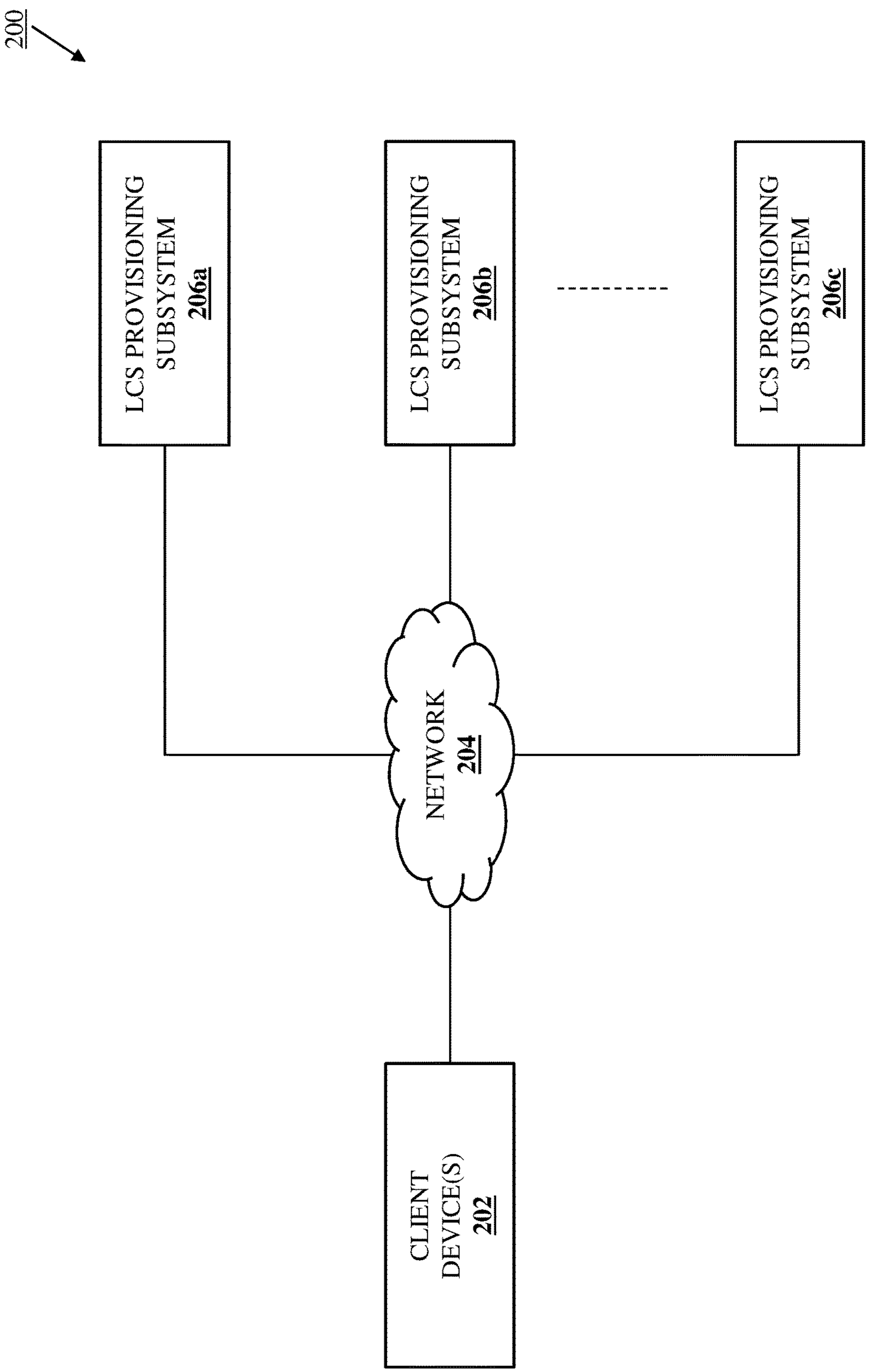
FIG. 2 is a schematic view illustrating an embodiment of an LCS provisioning system.

With reference to FIG. 2, an embodiment of an LCS provisioning system 200 is illustrated that may be utilized with the LCS workload in-band resource device management systems and methods of the present disclosure. In the illustrated embodiment, the LCS provisioning system 200 includes one or more client devices 202. In an embodiment, any or all of the client devices may be provided by the IHS 100 discussed above with reference to FIG. 1 and/or may include some or all of the components of the IHS 100, and in specific examples may be provided by desktop computing devices, laptop/notebook computing devices, tablet computing devices, mobile phones, and/or any other computing device known in the art. However, while illustrated and discussed as being provided by specific computing devices, one of skill in the art in possession of the present disclosure will recognize that the functionality of the client device(s) 202 discussed below may be provided by other computing devices that are configured to operate similarly as the client device(s) 202 discussed below, and that one of skill in the art in possession of the present disclosure would recognize as utilizing the LCSs described herein. As illustrated, the client device(s) 202 may be coupled to a network 204 that may be provided by a Local Area Network (LAN), the Internet, combinations thereof, and/or any of network that would be apparent to one of skill in the art in possession of the present disclosure.

As also illustrated in FIG. 2, a plurality of LCS provisioning subsystems 206*a*, 206*b*, and up to 206*c* are coupled to the network 204 such that any or all of those LCS provisioning subsystems 206*a*-206*c* may provide LCSs to the client device(s) 202 as discussed in further detail below. In an embodiment, any or all of the LCS provisioning subsystems 206*a*-206*c* may include one or more of the IHS 100 discussed above with reference to FIG. 1 and/or may include some or all of the components of the IHS 100. For example, in some of the specific examples provided below, each of the LCS provisioning subsystems 206*a*-206*c* may be provided by a respective datacenter or other computing device/computing component location (e.g., a respective one of the "clouds" that enables the "multi-cloud" computing discussed above) in which the components of that LCS provisioning subsystem are included. However, while a specific configuration of the LCS provisioning system 200 (e.g., including multiple LCS provisioning subsystems 206*a*-206*c*) is illustrated and described, one of skill in the art in possession of the present disclosure will recognize that other configurations of the LCS provisioning system 200 (e.g., a single LCS provisioning subsystem, LCS provisioning subsystems that span multiple datacenters/computing device/computing component locations, etc.) will fall within the scope of the present disclosure as well.

Figure 3:
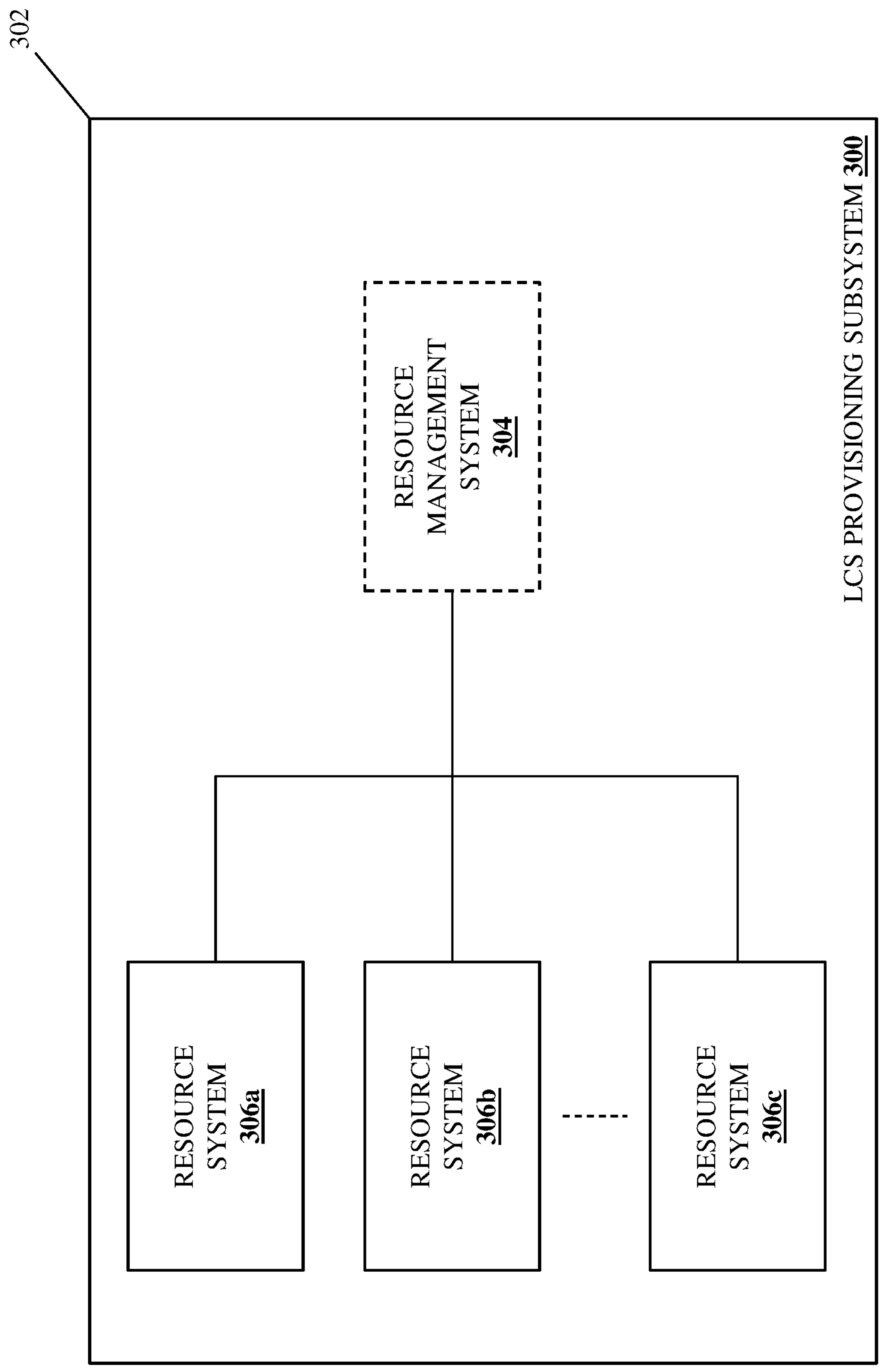
FIG. 3 is a schematic view illustrating an embodiment of an LCS provisioning subsystem that may be included in the LCS provisioning system of FIG. 2.

With reference to FIG. 3, an embodiment of an LCS provisioning subsystem 300 is illustrated that may provide any of the LCS provisioning subsystems 206*a*-206*c* discussed above with reference to FIG. 2. As such, the LCS provisioning subsystem 300 may include one or more of the IHS 100 discussed above with reference to FIG. 1 and/or may include some or all of the components of the IHS 100, and in the specific examples provided below may be provided by a datacenter or other computing device/computing component location in which the components of the LCS provisioning subsystem 300 are included. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

In the illustrated embodiment, the LCS provisioning subsystem 300 is provided in a datacenter 302 and includes a resource management system 304 coupled to a plurality of resource systems 306*a*, 306*b*, and up to 306*c*. In an embodiment, any of the resource management system 304 and the resource systems 306*a*-306*c* may be provided by the IHS 100 discussed above with reference to FIG. 1 and/or may include some or all of the components of the IHS 100. In the specific embodiments provided below, each of the resource management system 304 and the resource systems 306*a*-306*c* may include a System Control Processor (SCP) device that may be conceptualized as an "enhanced" SmartNIC device that may be configured to perform functionality that is not available in conventional SmartNIC devices such as, for example, the resource management functionality, LCS provisioning functionality, and/or other SCP functionality described herein.

In an embodiment, any of the resource systems 306*a*-306*c* may include any of the resources described below coupled to an SCP device that is configured to facilitate the management of those resources by the resource management system 304. Furthermore, the SCP device included in the resource management system 304 may provide an SCP Manager (SCPM) subsystem that is configured to manage the SCP devices in the resource systems 306*a*-306*c*, and that performs the functionality of the resource management system 304 described below. In some examples, the resource management system 304 may be provided by a "stand-alone" system (e.g., that is provided in a separate chassis from each of the resource systems 306*a*-306*c*), and the SCPM subsystem discussed below may be provided by a dedicated SCP device, processing/memory resources, and/or other components in that resource management system 304. However, in other embodiments, the resource management system 304 may be provided by one of the resource systems 306*a*-306*c* (e.g., it may be provided in a chassis of one of the resource systems 306*a*-306*c*), and the SCPM subsystem may be provided by an SCP device, processing/memory resources, and/or any other any other components om that resource system.

As such, the resource management system 304 is illustrated with dashed lines in FIG. 3 to indicate that it may be a stand-alone system in some embodiments or may be provided by one of the resource systems 306*a*-306*c* in other embodiments. Furthermore, one of skill in the art in possession of the present disclosure will appreciate how SCP devices in the resource systems 306*a*-306*c* may operate to "elect" or otherwise select one or more of those SCP devices to operate as the SCPM subsystem that provides the resource management system 304 described below. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

Figure 4:
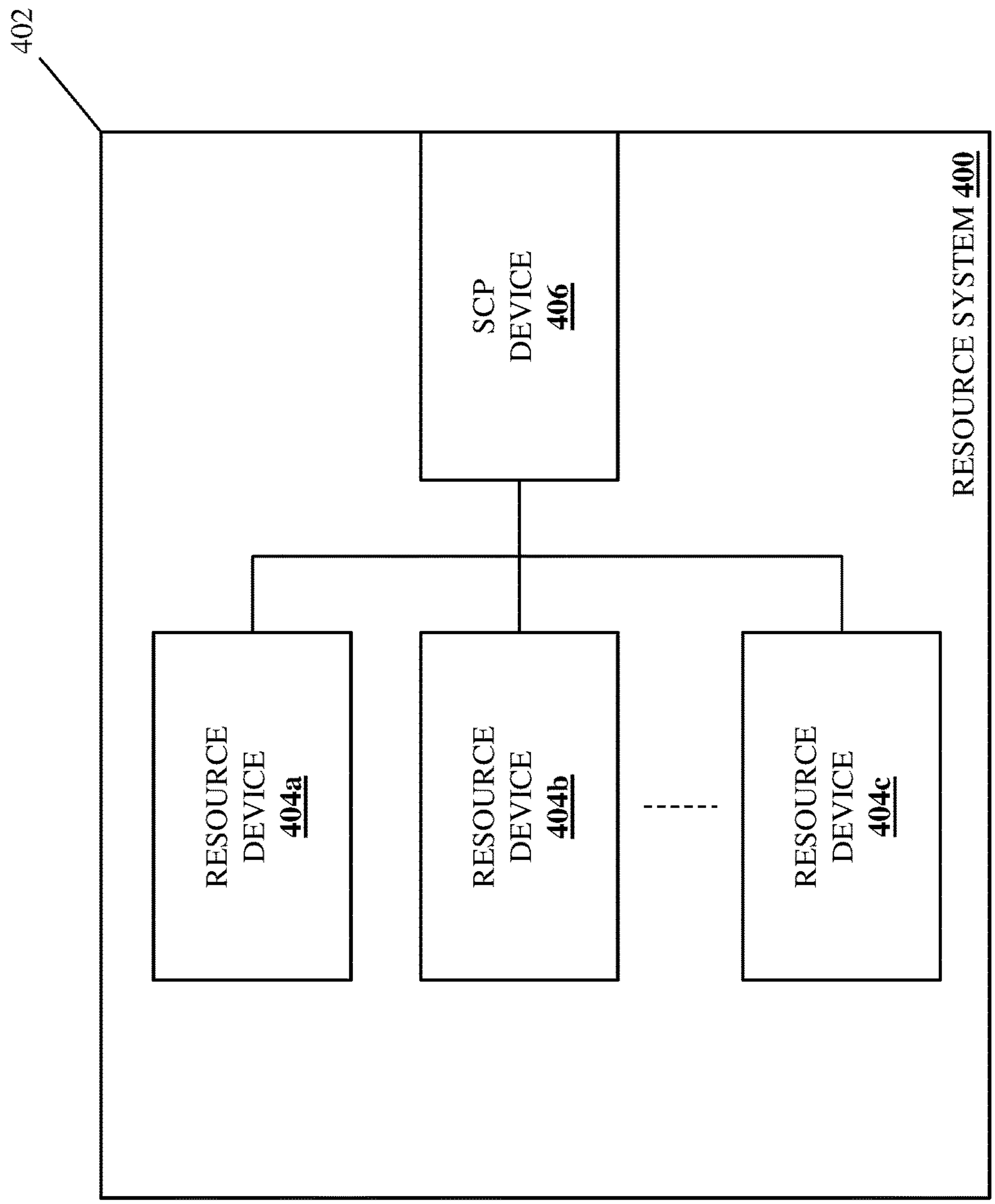
FIG. 4 is a schematic view illustrating an embodiment of a resource system that may be included in the LCS provisioning subsystem of FIG. 3.

With reference to FIG. 4, an embodiment of a resource system 400 is illustrated that may provide any or all of the resource systems 306*a*-306*c* discussed above with reference to FIG. 3. In an embodiment, the resource system 400 may be provided by the IHS 100 discussed above with reference to FIG. 1 and/or may include some or all of the components of the IHS 100. In the illustrated embodiment, the resource system 400 includes a chassis 402 that houses the components of the resource system 400, only some of which are illustrated and discussed below. In the illustrated embodiment, the chassis 402 houses an SCP device 406. In an embodiment, the SCP device 406 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an SCP engine that is configured to perform the functionality of the SCP engines and/or SCP devices discussed below. Furthermore, the SCP device 406 may also include any of a variety of SCP components (e.g., hardware/software) that are configured to enable any of the SCP functionality described below.

In the illustrated embodiment, the chassis 402 also houses a plurality of resource devices 404*a*, 404*b*, and up to 404*c*, each of which is coupled to the SCP device 406. For example, the resource devices 404*a*-404*c* may include processing systems (e.g., first type processing systems such as those available from INTEL® Corporation of Santa Clara, California, United States, second type processing systems such as those available from ADVANCED MICRO DEVICES (AMD)® Inc. of Santa Clara, California, United States, Advanced Reduced Instruction Set Computer (RISC) Machine (ARM) devices, Graphics Processing Unit (GPU) devices, Tensor Processing Unit (TPU) devices, Field Programmable Gate Array (FPGA) devices, accelerator devices, etc.); memory systems (e.g., Persistence MEMory (PMEM) devices (e.g., solid state byte-addressable memory devices that reside on a memory bus), etc.); storage devices (e.g., Non-Volatile Memory express over Fabric (NVMe-oF) storage devices, Just a Bunch Of Flash (JBOF) devices, etc.); networking devices (e.g., Network Interface Controller (NIC) devices, etc.); and/or any other devices that one of skill in the art in possession of the present disclosure would recognize as enabling the functionality described as being enabled by the resource devices 404*a*-404*c* discussed below. As such, the resource devices 404*a*-404*c* in the resource systems 306*a*-306*c*/400 may be considered a "pool" of resources that are available to the resource management system 304 for use in composing LCSs.

To provide a specific example, the SCP devices described herein may operate to provide a Root-of-Trust (RoT) for their corresponding resource devices/systems, to provide an intent management engine for managing the workload intents discussed below, to perform telemetry generation and/or reporting operations for their corresponding resource devices/systems, to perform identity operations for their corresponding resource devices/systems, provide an image boot engine (e.g., an operating system image boot engine) for LCSs composed using a processing system/memory system controlled by that SCP device, and/or perform any other operations that one of skill in the art in possession of the present disclosure would recognize as providing the functionality described below. Further, as discussed below, the SCP devices describe herein may include Software-Defined Storage (SDS) subsystems, inference subsystems, data protection subsystems, Software-Defined Networking (SDN) subsystems, trust subsystems, data management subsystems, compression subsystems, encryption subsystems, and/or any other hardware/software described herein that may be allocated to an LCS that is composed using the resource devices/systems controlled by that SCP device. However, while an SCP device is illustrated and described as performing the functionality discussed below, one of skill in the art in possession of the present disclosure will appreciated that functionality described herein may be enabled on other devices while remaining within the scope of the present disclosure as well.

Thus, the resource system 400 may include the chassis 402 including the SCP device 406 connected to any combinations of resource devices. To provide a specific embodiment, the resource system 400 may provide a "Bare Metal Server" (BMS) that one of skill in the art in possession of the present disclosure will recognize may be a physical server system that provides dedicated server hosting to a single tenant, and thus may include the chassis 402 housing a processing system and a memory system, the SCP device 406, as well as any other resource devices that would be apparent to one of skill in the art in possession of the present disclosure. However, in other specific embodiments, the resource system 400 may include the chassis 402 housing the SCP device 406 coupled to particular resource devices 404_a_-404_c_. For example, the chassis 402 of the resource system 400 may house a plurality of processing systems (i.e., the resource devices 404_a_-404_c_) coupled to the SCP device 406. In another example, the chassis 402 of the resource system 400 may house a plurality of memory systems (i.e., the resource devices 404_a_-404_c_) coupled to the SCP device 406. In another example, the chassis 402 of the resource system 400 may house a plurality of storage devices (i.e., the resource devices 404_a_-404_c_) coupled to the SCP device 406. In another example, the chassis 402 of the resource system 400 may house a plurality of networking devices (i.e., the resource devices 404_a_-404_c_) coupled to the SCP device 406. However, one of skill in the art in possession of the present disclosure will appreciate that the chassis 402 of the resource system 400 housing a combination of any of the resource devices discussed above will fall within the scope of the present disclosure as well.

As discussed in further detail below, the SCP device 406 in the resource system 400 will operate with the resource management system 304 (e.g., an SCPM subsystem) to allocate any of its resources devices 404_a_-404_c_ for use in a providing an LCS. Furthermore, the SCP device 406 in the resource system 400 may also operate to allocate SCP hardware and/or perform functionality, which may not be available in a resource device that it has allocated for use in providing an LCS, in order to provide any of a variety of functionality for the LCS. For example, the SCP engine and/or other hardware/software in the SCP device 406 may be configured to perform encryption functionality, compression functionality, and/or other storage functionality known in the art, and thus if that SCP device 406 allocates storage device(s) (which may be included in the resource devices it controls) for use in a providing an LCS, that SCP device 406 may also utilize its own SCP hardware and/or software to perform that encryption functionality, compression functionality, and/or other storage functionality as needed for the LCS as well. However, while particular SCP-enabled storage functionality is described herein, one of skill in the art in possession of the present disclosure will appreciate how the SCP devices 406 described herein may allocate SCP hardware and/or perform other enhanced functionality for an LCS provided via allocation of its resource devices 404_a_-404_c_ while remaining within the scope of the present disclosure as well.

Figure 5:
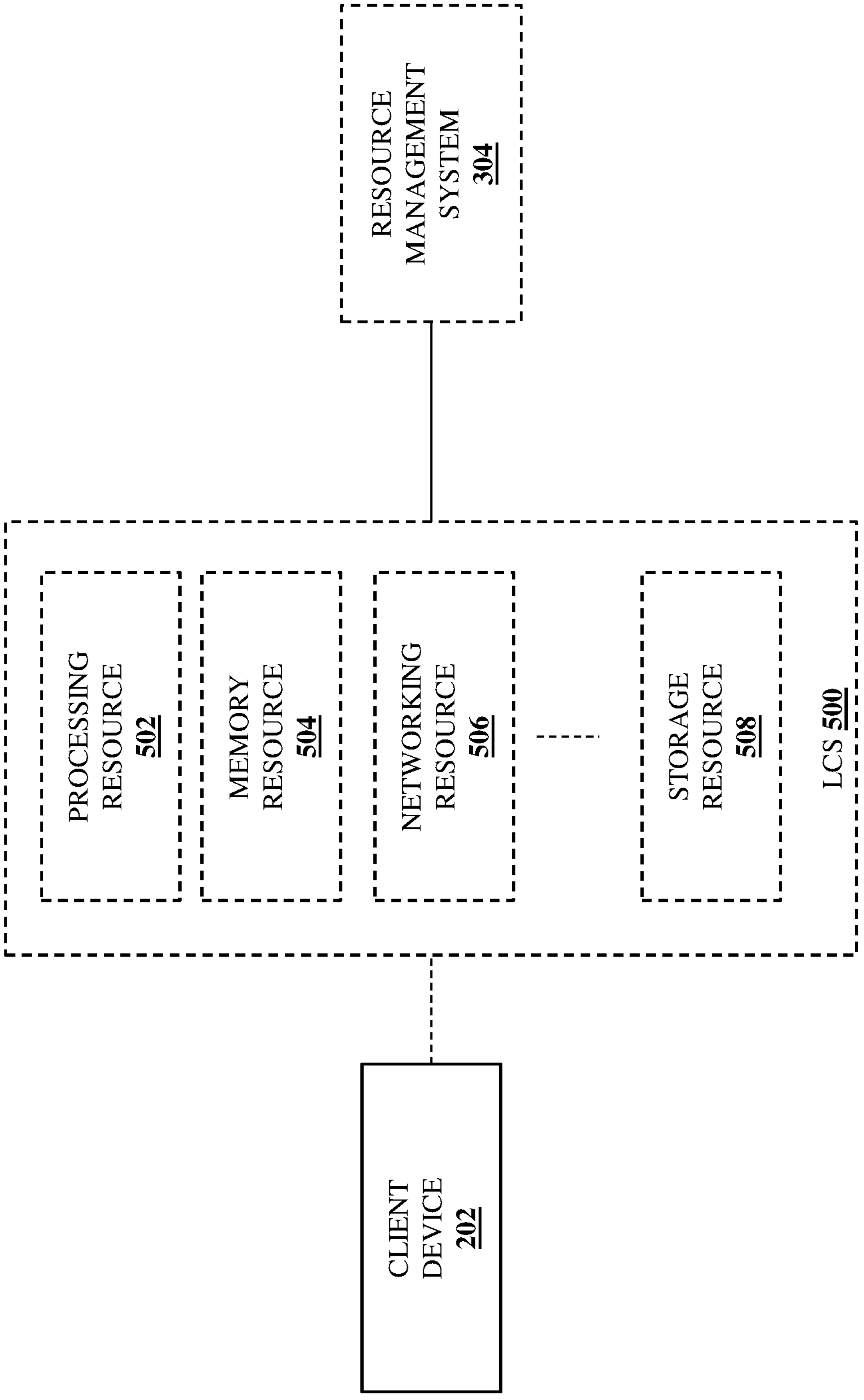
FIG. 5 is a schematic view illustrating an embodiment of the provisioning of an LCS using the LCS provisioning system of FIG. 2.

With reference to FIG. 5, an example of the provisioning of an LCS 500 to one of the client device(s) 202 is illustrated. For example, the LCS provisioning system 200 may allow a user of the client device 202 to express a "workload intent" that describes the general requirements of a workload that the user would like to perform (e.g., "I need an LCS with 10 gigahertz (GHz) of processing power and 8 gigabytes (GB) of memory capacity for an application requiring 20 terabytes (TB) of high-performance protected-object-storage for use with a hospital-compliant network", or "I need an LCS for a machine-learning environment requiring Tensorflow processing with 3 TBs of Accelerator PMEM memory capacity"). As will be appreciated by one of skill in the art in possession of the present disclosure, the workload intent discussed above may be provided to one of the LCS provisioning subsystems 206_a_-206_c_, and may be satisfied using resource systems that are included within that LCS provisioning subsystem or satisfied using resource systems that are included across the different LCS provisioning subsystems 206_a_-206_c_.

As such, the resource management system 304 in the LCS provisioning subsystem that received the workload intent may operate to compose the LCS 500 using resource devices 404_a_-404_c_ in the resource systems 306_a_-306_c_/400 in that LCS provisioning subsystem, and/or resource devices 404_a_-404_c_ in the resource systems 306_a_-306_c_/400 in any of the other LCS provisioning subsystems. FIG. 5 illustrates the LCS 500 including a processing resource 502 allocated from one or more processing systems provided by one or more of the resource devices 404_a_-404_c_ in one or more of the resource systems 306_a_-306_c_/400 in one or more of the LCS provisioning subsystems 206_a_-206_c_, a memory resource 504 allocated from one or more memory systems provided by one or more of the resource devices 404_a_-404_c_ in one or more of the resource systems 306_a_-306_c_/400 in one or more of the LCS provisioning subsystems 206_a_-206_c_, a networking resource 506 allocated from one or more networking devices provided by one or more of the resource devices 404_a_-404_c_ in one or more of the resource systems 306_a_-306_c_/400 in one or more of the LCS provisioning subsystems 206_a_-206_c_, and/or a storage resource 508 allocated from one or more storage devices provided by one or more of the resource devices 404_a_-404_c_ in one or more of the resource systems 306_a_-306_c_/400 in one or more of the LCS provisioning subsystems 206_a_-206_c_.

Furthermore, as will be appreciated by one of skill in the art in possession of the present disclosure, any of the processing resource 502, memory resource 504, networking resource 506, and the storage resource 508 may be provided from a portion of a processing system (e.g., a core in a processor, a time-slice of processing cycles of a processor, etc.), a portion of a memory system (e.g., a subset of memory capacity in a memory device), a portion of a storage device (e.g., a subset of storage capacity in a storage device), and/or a portion of a networking device (e.g., a portion of the bandwidth of a networking device). Further still, as discussed above, the SCP device(s) 406 in the resource systems 306*a*-306*c*/400 that allocate any of the resource devices 404*a*-404*c* that provide the processing resource 502, memory resource 504, networking resource 506, and the storage resource 508 in the LCS 500 may also allocate their SCP hardware and/or perform enhanced functionality (e.g., the enhanced storage functionality in the specific examples provided above) for any of those resources that may otherwise not be available in the processing system, memory system, storage device, or networking device allocated to provide those resources in the LCS 500.

With the LCS 500 composed using the processing resources 502, the memory resources 504, the networking resources 506, and the storage resources 508, the resource management system 304 may provide the client device 202 resource communication information such as, for example, Internet Protocol (IP) addresses of each of the systems/devices that provide the resources that make up the LCS 500, in order to allow the client device 202 to communicate with those systems/devices in order to utilize the resources that make up the LCS 500. As will be appreciated by one of skill in the art in possession of the present disclosure, the resource communication information may include any information that allows the client device 202 to present the LCS 500 to a user in a manner that makes the LCS 500 appear the same as an integrated physical system having the same resources as the LCS 500.

Thus, continuing with the specific example above in which the user provided the workload intent defining an LCS with a 10 GHz of processing power and 8 GB of memory capacity for an application with 20 TB of high-performance protected object storage for use with a hospital-compliant network, the processing resources 502 in the LCS 500 may be configured to utilize 10 GHz of processing power from processing systems provided by resource device(s) in the resource system(s), the memory resources 504 in the LCS 500 may be configured to utilize 8 GB of memory capacity from memory systems provided by resource device(s) in the resource system(s), the storage resources 508 in the LCS 500 may be configured to utilize 20 TB of storage capacity from high-performance protected-object-storage storage device(s) provided by resource device(s) in the resource system(s), and the networking resources 506 in the LCS 500 may be configured to utilize hospital-compliant networking device(s) provided by resource device(s) in the resource system(s).

Similarly, continuing with the specific example above in which the user provided the workload intent defining an LCS for a machine-learning environment for Tensorflow processing with 3 TBs of Accelerator PMEM memory capacity, the processing resources 502 in the LCS 500 may be configured to utilize TPU processing systems provided by resource device(s) in the resource system(s), and the memory resources 504 in the LCS 500 may be configured to utilize 3 TB of accelerator PMEM memory capacity from processing systems/memory systems provided by resource device(s) in the resource system(s), while any networking/storage functionality may be provided for the networking resources 506 and storage resources 508 if needed.

Figure 6:
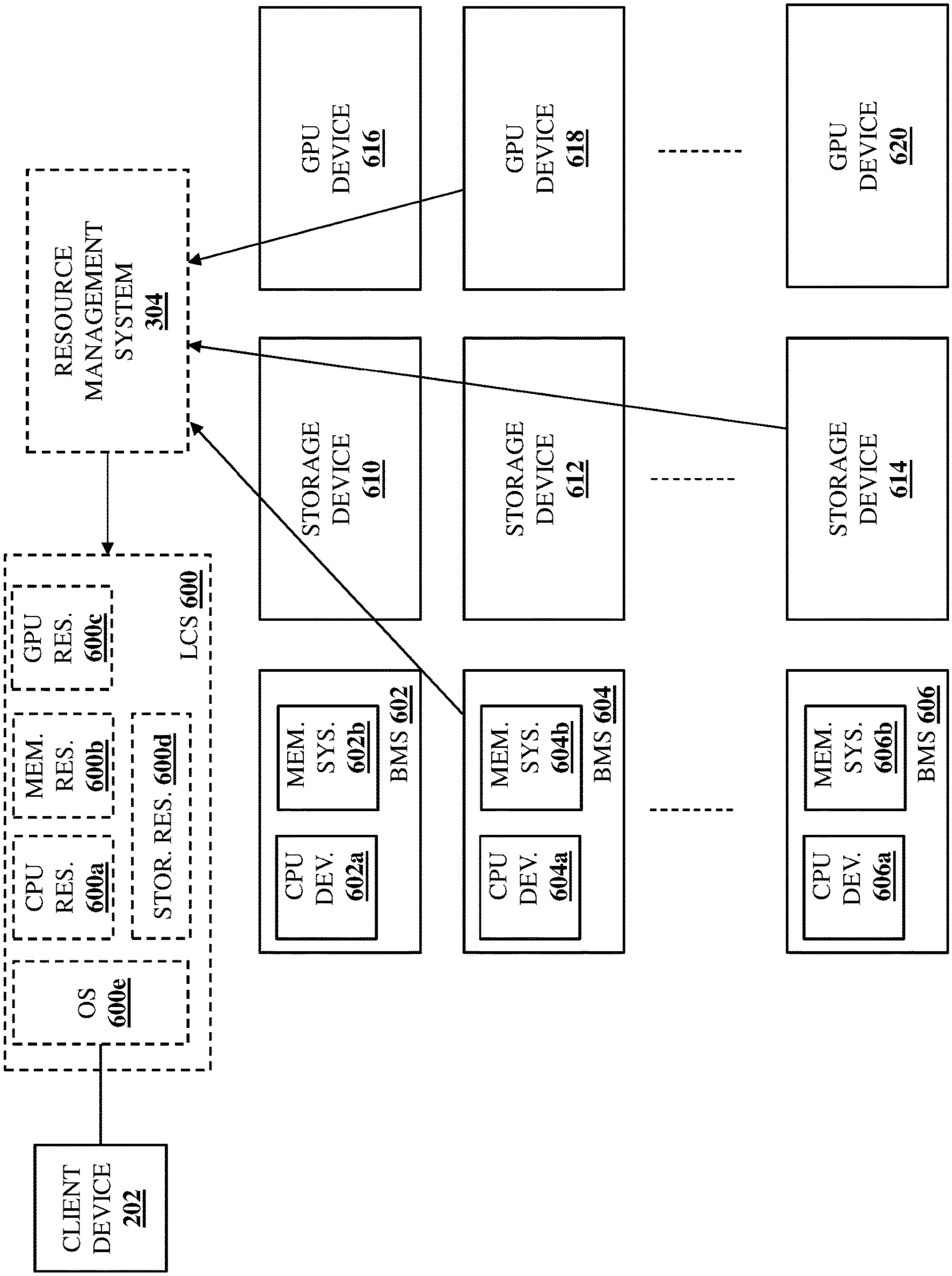
FIG. 6 is a schematic view illustrating an embodiment of the provisioning of an LCS using the LCS provisioning system of FIG. 2.

With reference to FIG. 6, another example of the provisioning of an LCS 600 to one of the client device(s) 202 is illustrated. As will be appreciated by one of skill in the art in possession of the present disclosure, many of the LCSs provided by the LCS provisioning system 200 will utilize a "compute" resource (e.g., provided by a processing resource such as an x86 processor, an AMD processor, an ARM processor, and/or other processing systems known in the art, along with a memory system that includes instructions that, when executed by the processing system, cause the processing system to perform any of a variety of compute operations known in the art), and in many situations, those compute resources may be allocated from a Bare Metal Server (BMS) and presented to a client device 202 user along with storage resources, networking resources, other processing resources (e.g., GPU resources), and/or any other resources that would be apparent to one of skill in the art in possession of the present disclosure.

As such, in the illustrated embodiment, the resource systems 306*a*-306*c* available to the resource management system 304 include a Bare Metal Server (BMS) 602 having a Central Processing Unit (CPU) device 602*a* and a memory system 602*b*, a BMS 604 having a CPU device 604*a* and a memory system 604*b*, and up to a BMS 606 having a CPU device 606*a* and a memory system 606*b*. Furthermore, one or more of the resource systems 306*a*-306*c* includes resource devices 404*a*-404*c* provided by a storage device 610, a storage device 612, and up to a storage device 614. Further still, one or more of the resource systems 306*a*-306*c* includes resource devices 404*a*-404*c* provided by a Graphics Processing Unit (GPU) device 616, a GPU device 618, and up to a GPU device 620.

FIG. 6 illustrates how the resource management system 304 may compose the LCS 600 using the BMS 604 to provide the LCS 600 with CPU resources 600*a* that utilize the CPU device 604*a* in the BMS 604, and memory resources 600*b* that utilize the memory system 604*b* in the BMS 604. Furthermore, the resource management system 304 may compose the LCS 600 using the storage device 614 to provide the LCS 600 with storage resources 600*d* and using the GPU device 318 to provide the LCS 600 with GPU resources 600*c*. As illustrated in the specific example in FIG. 6, the CPU device 604*a* and the memory system 604*b* in the BMS 604 may be configured to provide an operating system 600*e* (and/or other application) that is presented to the client device 202 as being provided by the CPU resources 600*a* and the memory resources 600*b* in the LCS 600, with operating system 600*e* utilizing the GPU device 618 to provide the GPU resources 600*c* in the LCS 600, and utilizing the storage device 614 to provide the storage resources 600*d* in the LCS 600. The user of the client device 202 may then provide any application(s) on the operating system 600*e* provided by the CPU resources 600*a*/CPU device 604*a* and the memory resources 600*b*/memory system 604*b* in the LCS 600/BMS 604, with the application(s) operating using the CPU resources 600*a*/CPU device 604*a*, the memory resources 600*b*/memory system 604*b*, the GPU resources 600*c*/GPU device 618, and the storage resources 600*d*/storage device 614.

Furthermore, as discussed above, the SCP device(s) 406 in the resource systems 306*a*-306*c*/400 that allocates any of the CPU device 604*a* and memory system 604*b* in the BMS 604 that provide the CPU resource 600*a* and memory resource 600*b*, the GPU device 618 that provides the GPU resource 600*c*, and the storage device 614 that provides storage resource 600*d*, may also allocate SCP hardware and/or perform enhanced functionality (e.g., the enhanced storage functionality in the specific examples provided above) for any of those resources that may otherwise not be available in the CPU device 604*a*, memory system 604*b*, storage device 614, or GPU device 618 allocated to provide those resources in the LCS 500.

However, while simplified examples are described above, one of skill in the art in possession of the present disclosure will appreciate how multiple devices/systems (e.g., multiple CPUs, memory systems, storage devices, and/or GPU devices) may be utilized to provide an LCS. Furthermore, any of the resources utilized to provide an LCS (e.g., the CPU resources, memory resources, storage resources, and/or GPU resources discussed above) need not be restricted to the same device/system, and instead may be provided by different devices/systems over time (e.g., the GPU resources 600*c* may be provided by the GPU device 618 during a first time period, by the GPU device 616 during a second time period, and so on) while remaining within the scope of the present disclosure as well. Further still, while the discussions above imply the allocation of physical hardware to provide LCSs, one of skill in the art in possession of the present disclosure will recognize that the LCSs described herein may be composed similarly as discussed herein from virtual resources. For example, the resource management system 304 may be configured to allocate a portion of a logical volume provided in a Redundant Array of Independent Disk (RAID) system to an LCS, allocate a portion/time-slice of GPU processing performed by a GPU device to an LCS, and/or perform any other virtual resource allocation that would be apparent to one of skill in the art in possession of the present disclosure in order to compose an LCS.

Similarly as discussed above, with the LCS 600 composed using the CPU resources 600*a*, the memory resources 600*b*, the GPU resources 600*c*, and the storage resources 600*d*, the resource management system 304 may provide the client device 202 resource communication information such as, for example, Internet Protocol (IP) addresses of each of the systems/devices that provide the resources that make up the LCS 600, in order to allow the client device 202 to communicate with those systems/devices in order to utilize the resources that make up the LCS 600. As will be appreciated by one of skill in the art in possession of the present disclosure, the resource communication information allows the client device 202 to present the LCS 600 to a user in a manner that makes the LCS 600 appear the same as an integrated physical system having the same resources as the LCS 600.

As will be appreciated by one of skill in the art in possession of the present disclosure, the LCS provisioning system 200 discussed above solves issues present in conventional Information Technology (IT) infrastructure systems that utilize "purpose-built" devices (server devices, storage devices, etc.) in the performance of workloads and that often result in resources in those devices being under-utilized. This is accomplished, at least in part, by having the resource management system(s) 304 "build" LCSs that satisfy the needs of workloads when they are deployed. As such, a user of a workload need simply define the needs of that workload via a "manifest" expressing the workload intent of the workload, and resource management system 304 may then compose an LCS by allocating resources that define that LCS and that satisfy the requirements expressed in its workload intent, and present that LCS to the user such that the user interacts with those resources in the same manner as they would with a physical system at their location having those same resources.

As discussed above, workloads provided by an operating system and/or other application provided using an LCS may have dynamic resource requirements, but such workloads are not configured to perform "out-of-band" communications with the resource management system 304, and thus do not have the ability to discover, modify, or otherwise manage resource devices provided to their LCS. As such, conventional LCSs are limited following their composition, and thus may provide for the inefficient performance of a workload for which they were composed, particularly when the resource requirements for that workload change. In order to remedy such issues, the inventors of the present disclosure have developed systems and methods for enabling "in-band" management of resource devices by a workload which, as discussed below, provide for the direct identification to the workload of resource devices that are available to the LCS for use by that workload, thus allowing that workload to directly request the provisioning of any of those resource devices as its resource requirements change and without the need to directly communication with the resource management system 304.

Figure 7:
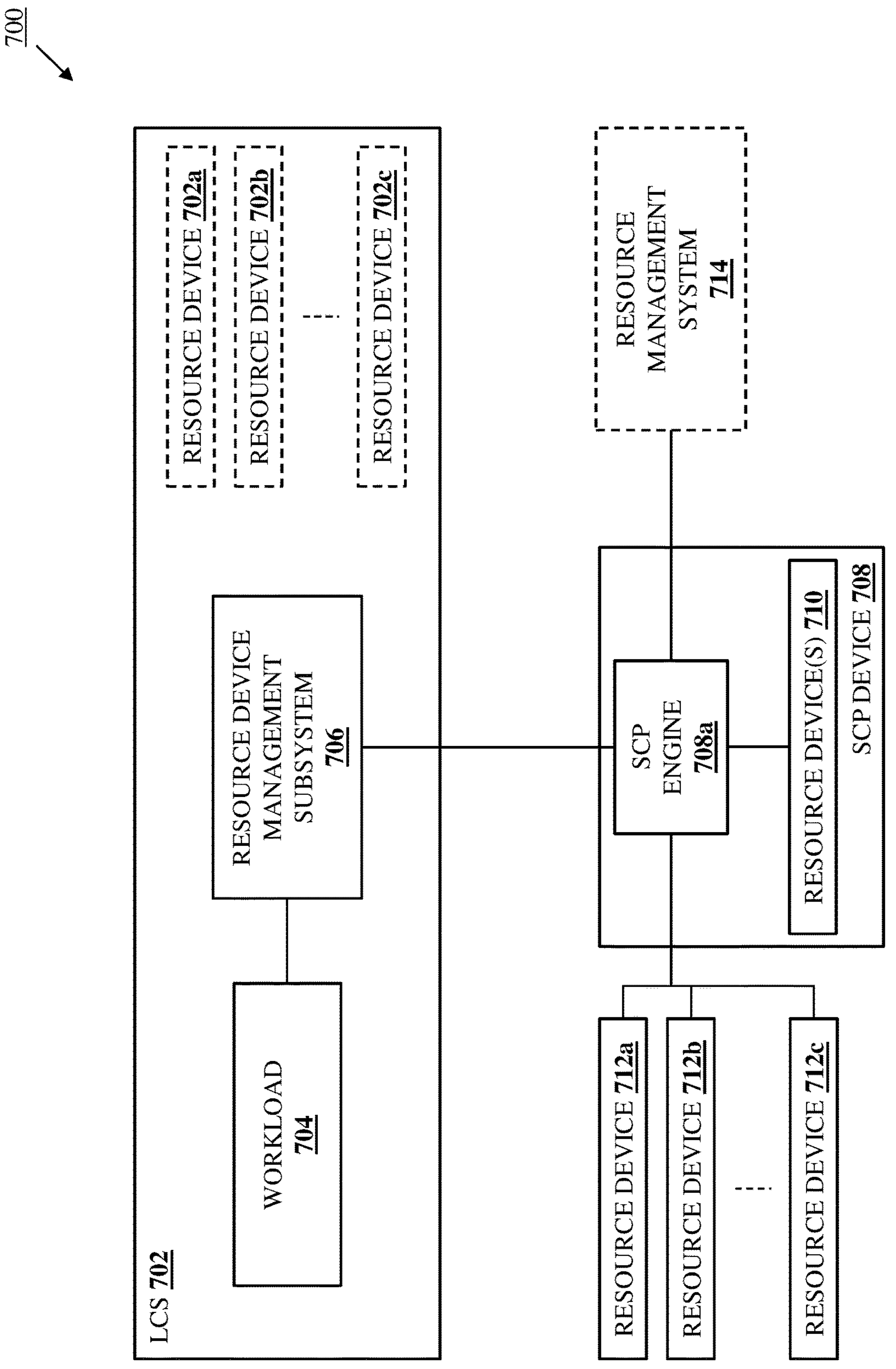
FIG. 7 is a schematic view illustrating an embodiment of an LCS workload in-band resource device management system provided according to the teachings of the present disclosure.

Referring now to FIG. 7, an embodiment of an LCS workload in-band resource device management system 700 is illustrated that may be provided according to the teachings of the present disclosure. In the illustrated embodiment, the LCS workload in-band resource device management system 700 includes an LCS 702 that one of skill in the art in possession of the present disclosure will recognize may be provided similarly as any of the LCSs discussed above. In the illustrated embodiment, the LCS 702 is provided using a plurality of resource devices 702*a*, 702*b*, and up to 702*c*, with those resource devices 702*a*-702*c* illustrated in dashed lines to indicate how those resource devices 702*a*-702*c* may be provided from any of a variety of the resource systems described above. As such, one of skill in the art in possession of the present disclosure will recognize how any of the resource devices 702*a*-702*c* (e.g., the processing systems and memory systems discussed above) may be utilized to provide an operating system and/or other applications that then operate to provide a workload 704 on the LCS 702 that is configured to utilize any of the resource devices 702*a*-702*c*.

The LCS 702 also includes a resource device management subsystem 706, which one of skill in the art in possession of the present disclosure will appreciate may be provided by a processing system (e.g., one of the resource devices 702*a*-702*c*) and a memory system (e.g., one of the resource devices 702*a*-702*c*) that is coupled to the processing system and that includes instructions that, when executed by the processing system, cause the processing system to provide the resource device management subsystem 706 that is configured to perform the functionality of the resource device management engines and/or resource device management subsystems discussed below. In an embodiment, the resource device management subsystem 706 may be provided by an LCS device driver, a microvisor, and/or any other resource device management components/LCS system functions that one of skill in the art in possession of the present disclosure would recognize as providing for the resource device management functionality discussed below. To provide a specific example, the LCS 702 may be provided by a virtual machine, container, or other LCS subsystems discussed above, with the resource device management functionality (described below as being performed by the resource device management subsystem 706) assigned to that LCS 702 in the provided resource file hierarchy described below. However, while a specific LCS 702 and resource device management subsystem 706 have been described, one of skill in the art in possession of the present disclosure will appreciate how LCSs and resource device management subsystems may be provided using a variety of techniques that will fall within the scope of the present disclosure as well.

In the illustrated embodiment, the LCS workload in-band resource device management system 700 also includes an SCP device 708 that may be provided by any of the SCP devices discussed above. For example, the SCP device 708 may be provided in the resource system/BMS system that includes the resource devices (e.g., the processing system and memory system) that are used to provide the workload 704 (e.g., provided by an operating system and/or application) in the LCS 702 described herein, although one of skill in the art in possession of the present disclosure will appreciate how other SCP devices may be utilized to provide the SCP device 708 while remaining within the scope of the present disclosure as well. In an embodiment, the SCP device 708 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an SCP engine 708*a* that is configured to perform the functionality of the SCP engines and/or SCP devices discussed below.

As illustrated, the SCP device 708 may include one or more resource devices 710 that are coupled to the SCP engine 708*a* (e.g., via a coupling between the resource device(s) 710 and the processing system that provides the SCP engine 708*a*) and that, as discussed above, may be made available to and/or provided to LCSs by the SCP device 708. Furthermore, the LCS workload in-band resource device management system 700 also includes a plurality of resource devices 712*a*, 712*b*, and up to 712*c* that are coupled to the SCP engine 708*a* (e.g., via a coupling between the resource device(s) 710 and the processing system that provides the SCP engine 708*a*) and that, as discussed above, may be made available to and/or provided to LCSs by the SCP device 708. In the specific examples below, the SCP device 708 provides the resource devices 702*a*-702*c* to the LCS 702 for use by the workload 704 (with the resource devices 702*a*-702*c* located either within or outside of the resource system/BMS system that includes the SCP device 708 and the processing system/memory system that provide an operating system for the LCS 702, as discussed above), while making the resource devices 710 and 712*a*-712*c* available for use by the workload 704 on the LCS 702 but not initially provided those resource devices to the LCS 702 for utilization by the workload 704 (i.e., those resource devices are available for use but not provided for use to the workload 704 upon the initial composition of the LCS 702 using the resource devices 702*a*-702*c*). However, while a specific example of resources devices provided to and available to an LCS 702 is illustrated and described, one of skill in the art in possession of the present disclosure will appreciate how an LCS may be composed using resource devices in a variety of manners that will fall within the scope of the present disclosure as well.

In the illustrated embodiment, the LCS workload in-band resource device management system 700 also includes a resource management system 714 that is coupled to the SCP engine 708*a* (e.g., via a coupling between the processing system that provides the resource management system 714 and the processing system that provides the SCP engine 708*a*), and that may be provided by the resource management system 304 discussed above. As such, the resource management system 714 may be provided by an SCPM device, which as discussed above may be a "stand-alone" SCPM device, or an SCPM device elected from one of a plurality of SCP devices (i.e., including the SCP device 708 in some examples). However, while a specific LCS workload in-band resource device management system 700 has been illustrated and described, one of skill in the art in possession of the present disclosure will recognize that the LCS workload in-band resource device management system provided according to the teachings of the present disclosure may include a variety of components and/or component configurations for providing LCS functionality, as well as the functionality discussed below, while remaining within the scope of the present disclosure as well.

Figure 8:
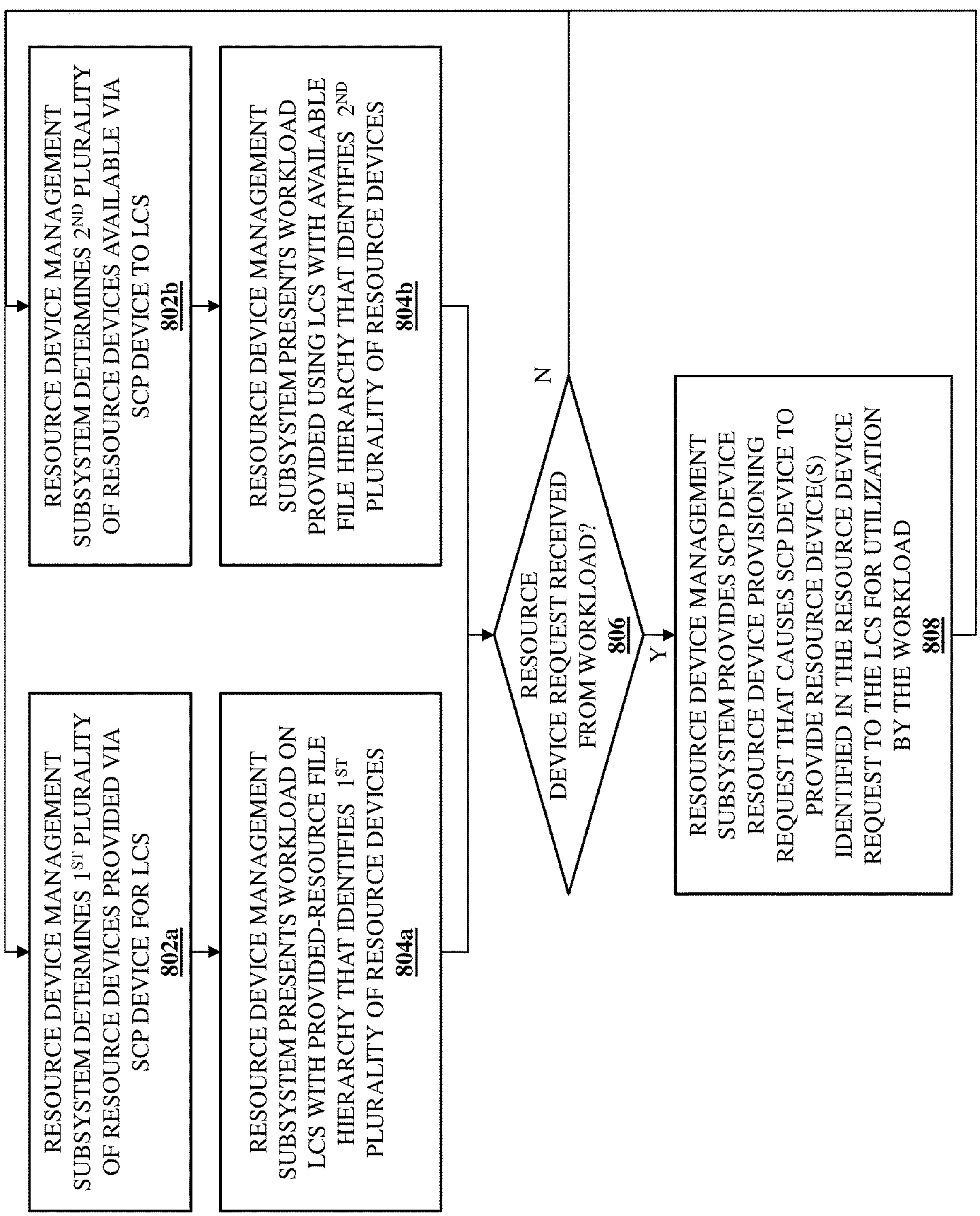
FIG. 8 is a flow chart illustrating an embodiment of a method for in-band management of resource devices by a workload provided on an LCS.

Referring now to FIG. 8, an embodiment of a method 800 for in-band management of resource devices by a workload provided on an LCS is illustrated. As discussed below, the systems and methods of the present disclosure provide for the identification of available and provisioned resource devices to a workload on an LCS, as well as the enablement of in-band management of those resource devices by the workload. For example, the LCS workload in-band resource device management system of the present disclosure may include a resource device management subsystem coupled to a workload that is provided using an LCS, and to a System Control Processor (SCP) device. The resource device management subsystem determines a first plurality of resource devices that are available via the SCP device for the LCS, and presents an available-resource file hierarchy to the workload that identifies the first plurality of resource devices. When the resource device management subsystem receives a resource device request from the workload for a first resource device that is included in the first plurality of resource devices identified in the available-resource file hierarchy, it provides a resource device provisioning request to the SCP device that is configured to cause the SCP device to provide the first resource device to the LCS for utilization by the workload. As such, the workload on the LCS may utilize in-band communications to request available resource devices in order to be provided those available resource devices as its resource requirements change.

Figure 9:
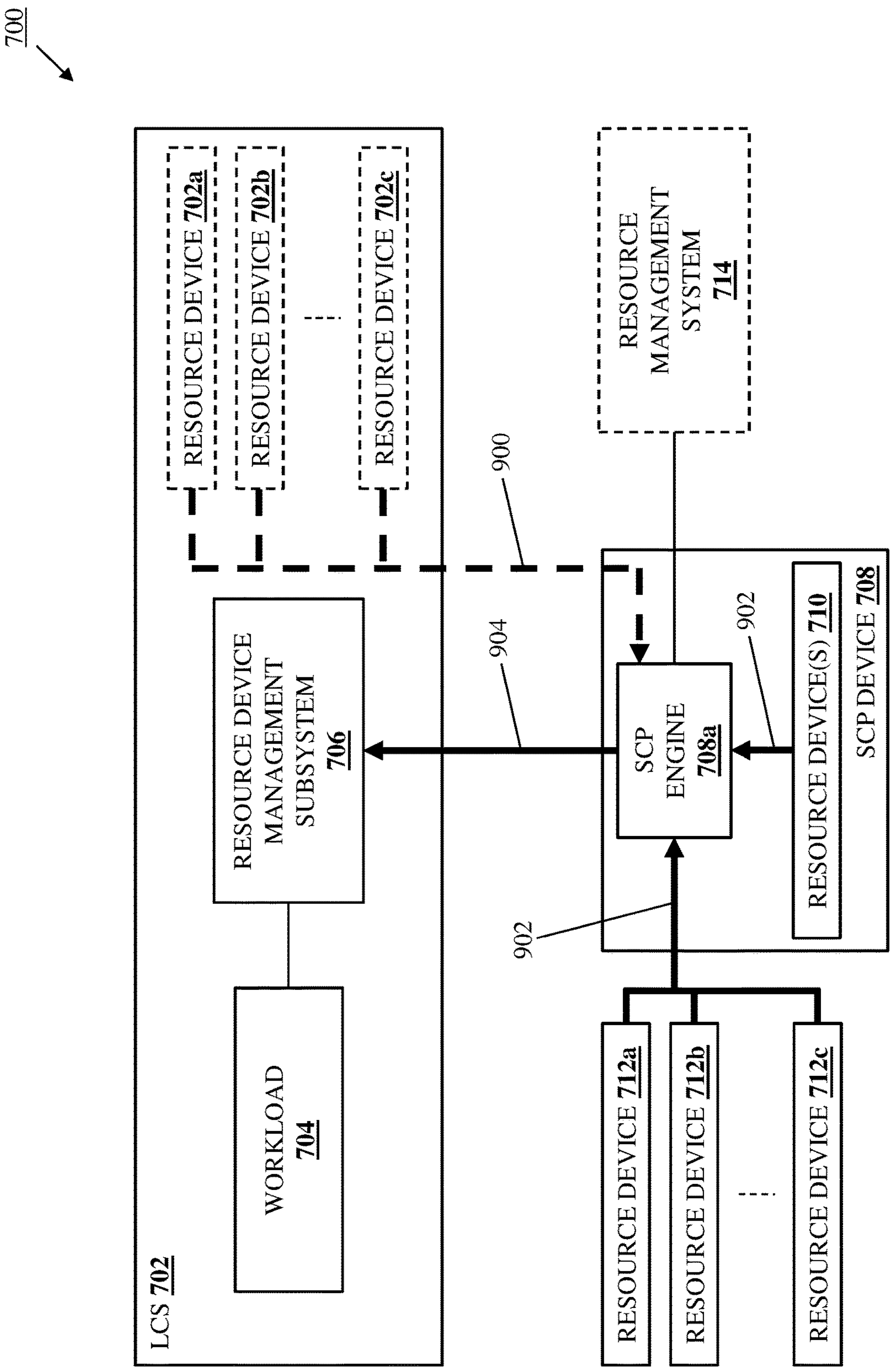
FIG. 9 is a schematic view illustrating an embodiment of the LCS workload in-band resource device management system of FIG. 7 operating during the method of FIG. 8.

The method 800 begins at blocks 802*a* and 802*b* where a resource device management subsystem determines a first plurality of resource devices that are provided via an SCP device for an LCS, and a second plurality of resource devices that are available via an SCP device to the LCS, respectively. With reference to FIG. 9, in an embodiment of block 802*a*, the SCP engine 708*a* in the SCP device 708 may perform provided-resource device identification operations 900 that include identifying the resource devices 702*a*-702*c* that are being used to provide the LCS 702 and/or that are provided for utilization by the workload 704. As will be appreciated by one of skill in the art in possession of the present disclosure, the SCP engine 708*a* in the SCP device 708 may have previously operated (e.g., with the resource management system 714 provided by, for example, an SCPM device as discussed above) to compose the LCS 702 using the resource devices 702*a*-702*c*, and thus the identification of the resource devices 702*a*-702*c* that are being used to provide the LCS 702 and/or that are provided for utilization by the workload 704 may include identifying those resource devices 702*a*-702*c* in a database that is accessible to the SCP engine 708*a*. However, while specific techniques for identifying resource devices that are being used to provide an LCS and/or that are provided for utilization by a workload on an LCS have been described, one of skill in the art in possession of the present disclosure will appreciate that other techniques for such provided resource device identification will fall within the scope of the present disclosure as well.

With continued reference to FIG. 9, in an embodiment of block 802*b*, the SCP engine 708 in the SCP device 708 may perform available resource device identification operations 902 that include identifying the resource devices 710 and 712*a*-712*c* that are available to the LCS 702 and/or the workload 704. As discussed above, the SCP engine 708*a* in the SCP device 708 is coupled to resource devices that are not currently provided to the LCS 702 and/or the workload 704 but that are available to the LCS 702 and/or the workload 704, and in a specific example the identification of the resource devices 702*a*-702 that are available to the LCS 702 and/or that are available for utilization by the workload 704 may include the identification of resource devices 710 and 712*a*-712*c* that are both coupled to the SCP engine 708*a* and authorized for use by the LCS 702 and/or the workload. For example, the LCS 702 and/or the workload 704 may be defined (e.g., by the resource management system 714 as discussed above) as being authorized to utilize particular resource devices, and thus the SCP engine 708*a* in the SCP device 708 may only identify those particular resource devices as being available to the LCS 702 and/or the workload 704. However, while specific techniques for identifying resource devices that are available to an LCS and/or that are available for utilization by a workload on an LCS have been described, one of skill in the art in possession of the present disclosure will appreciate that other techniques for such available resource device identification will fall within the scope of the present disclosure as well.

With continued reference to FIG. 9, in an embodiment of blocks 802*a* and/or 802*b*, the SCP engine 708*a* may perform identified resource device identification operations 904 in order to identify the provided resource devices that were identified at block 802*a*, and/or to identify the available resource devices that were identified at block 802*b*, to the resource device management subsystem 706. As such, following the identification of the provided resource devices and/or the available resource devices as discussed above, the SCP engine 708*a* in the SCP device 708 may identify those provided resource devices and/or available resource devices to the resource device management subsystem 706 using any of a variety of techniques that would be apparent to one of skill in the art in possession of the present disclosure, and thus the resource device management subsystem 706 may determine the resource devices 702*a*-702*c* that are provided via the SCP device 708 for the LCS 702, and/or the resource devices 710 and 712*a*-712*c* that are available via the SCP device 708 to the LCS 702, via the identification of those resource devices by the SCP device 708 as described above.

In some embodiments, prior to identifying the provided resource devices (e.g., the resource devices 702*a*-702*c*) to the resource management device 706, the SCP engine 708*a* in the SCP device 708 may determine usage information, status information, telemetry information, and/or any other operating information for any of those provided resource devices that would be apparent to one of skill in the art in possession of the present disclosure. As such, the identification of any provided resource device to the resource management device 706 may include identifying the operating information generated by the provided resource device in response to its utilization by the LCS 702 and/or the workload 704. Similarly, in some embodiments and prior to identifying the available resource devices (e.g., the resource devices 710 and 712*a*-712*c*) to the resource management device 706, the SCP engine 708*a* in the SCP device 708 may determine usage information, status information, telemetry information, and/or any other operating information for any of those available resource devices that would be apparent to one of skill in the art in possession of the present disclosure. As such, the identification of any available resource device to the resource management device 706 may include identifying operating information generated by the available resource device in response to their utilization (e.g., by other LCSs and/or workloads).

Figure 10A:
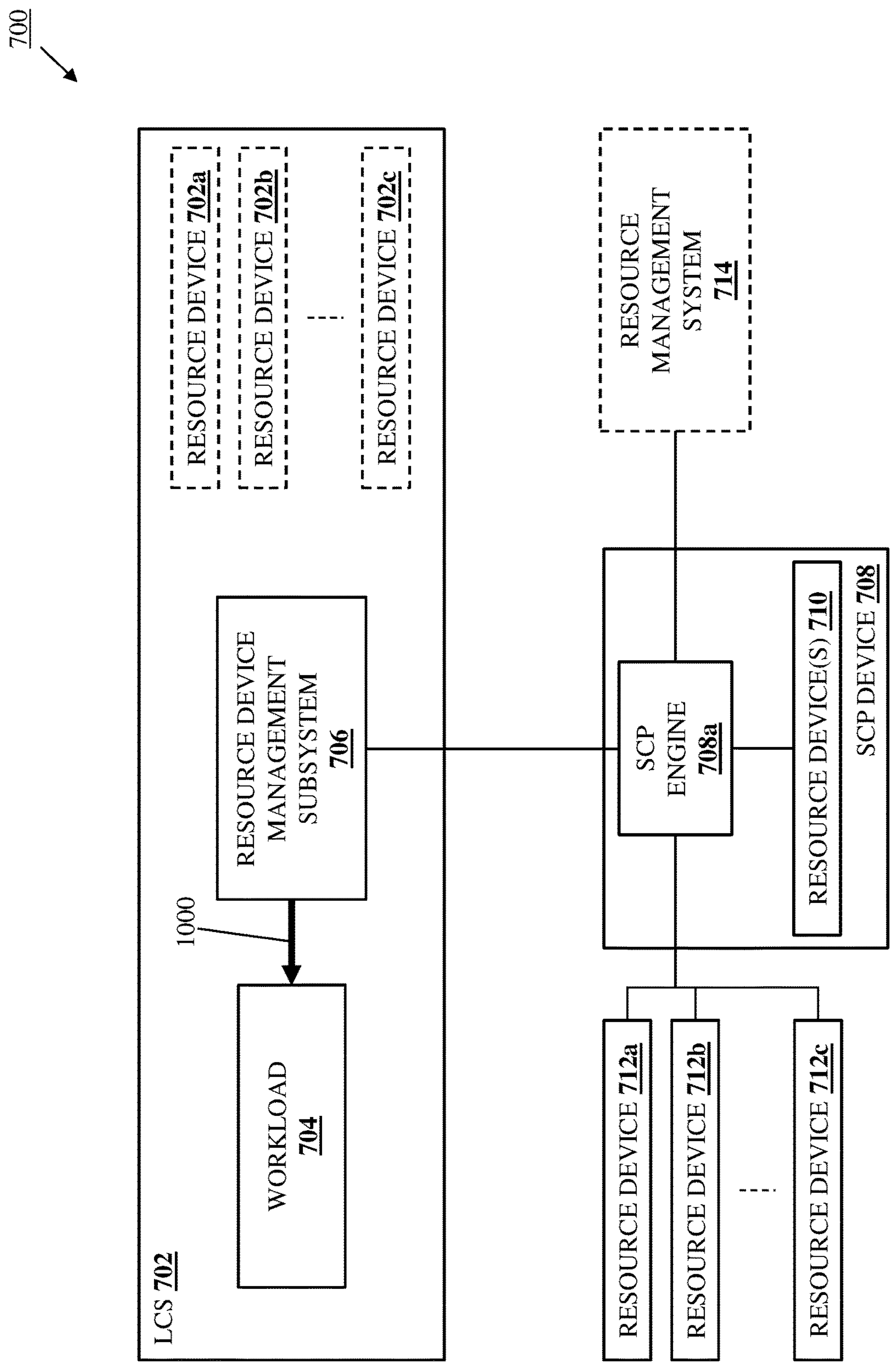
FIG. 10A is a schematic view illustrating an embodiment of the LCS workload in-band resource device management system of FIG. 7 operating during the method of FIG. 8.

The method 800 then proceeds to blocks 804*a* and 804*b* where the resource device management subsystem presents a workload that is being provided using the LCS with a provided-resource file hierarchy that identifies the first plurality of resource devices, and presents the workload that is being provided using the LCS with an available-resource file hierarchy that identifies the second plurality of resource devices. With reference to FIG. 10A, in an embodiment of block 804*a*, the resource device management subsystem 706 may perform provided-resource file hierarchy presentation operations 1000 that may include generating a provided-resource file hierarchy that identifies the provided resource devices that were determined at block 802*a*, attributes of those provided resource devices, operating information about those provided resource devices, and/or any other provided resource device information that would be apparent to one of skill in the art in possession of the present disclosure, and presenting the provided-resource file hierarchy to the workload 704.

Figure 10B:
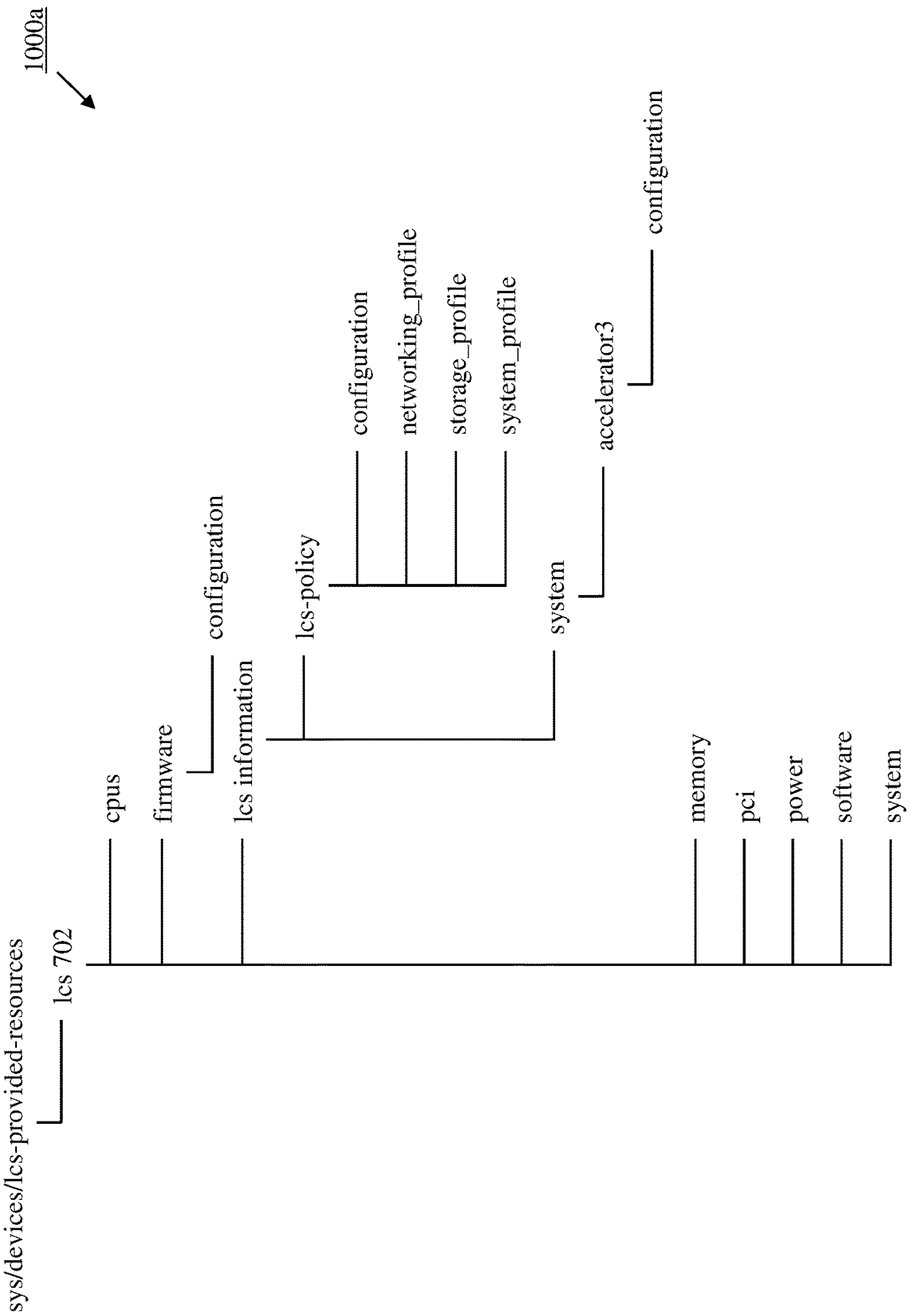
FIG. 10B is a tree-structure view illustrating an embodiment of a provided-resource file hierarchy that may be utilized during the method of FIG. 8.

For example, with reference to FIG. 10B, an embodiment of a provided-resource file hierarchy 1000*a* that may be presented to the workload 704 at block 804*a* is illustrated. As can be seen in FIG. 10B, the provided-resource file hierarchy 1000*a* may be provided by a tree structure (e.g., a "virtual device tree") that is configured to identify resources provided to LCSs (e.g., "sys/devices/lcs-provided-resources" at the top of the provided-resource file hierarchy 1000*a*), with the LCS 702 identified in a first branch of the tree structure (e.g., "lcs 702"). Furthermore, resources provided by processing systems (e.g., "cpus"), firmware systems (e.g., "firmware"), LCS subsystems (e.g., "lcs information"), memory systems (e.g., "memory"), Peripheral Component Interconnect express (PCIe) systems (e.g., "pci"), power systems (e.g., "power"), software systems (e.g., "power"), other systems (e.g., "system") may be identified by second branches extending from the first branch of the tree structure. In the specific example illustrated in FIG. 10B, a third branch extends from the second branch identifying the firmware systems, and identifies a configuration for that firmware system (e.g., "configuration"), a third branch extends from the second branch identifying the LCS subsystems, and identifies LCS policies ("lcs policy"), with fourth branches extending from that third branch and identifying an LCS policy configuration (e.g., "configuration"), a networking profile (e.g., "networking_profile"), a storage profile (e.g., "storage_profile"), and a system profile (e.g., "system_profile") that provide those LCS policies. Similarly, a third branch extends from the second branch identifying the other systems, and identifies an accelerator system (e.g., "accelerator3"), with a fourth branch extending from that third branch and identifying a configuration (e.g., "configuration") of that accelerator system. As will be appreciated by one of skill in the art in possession of the present disclosure, a resource system (e.g., BMS system) may provide multiple LCSs, and thus the provided-resource file hierarchy 1000*a* may be utilized to identify provided resource devices for each of those LCSs (similarly to the "lcs 702" illustrated in FIG. 10B) while remaining within the scope of the present disclosure as well.

As will be appreciated by one of skill in the art in possession of the present disclosure, the provided-resource file hierarchy 1000*a* provides for the hierarchical organization of provided resources as files organized in a "tree" of files, and identifies resources that are provided to the lcs 702 and that may be configured by workloads on the lcs 702 via that "tree" of files. For example, a workload on the lcs 702 may modify its processing resources by modifying the sys/devices/lcs-provided-resources/cpus file, or may modify its system profile(s) by modifying the sys/devices/lcs-provided-resources//lcs information/lcs-policy/system_profile file. In another example, a workload on the les 702 may modify the sys/devices/lcs-provided-resources/lcs information/system/accelerator3/configuration file in order to modify the operating mode of the accelerator3 provided to the les 702. To provide a specific example, a configuration of an accelerator (e.g., a compression engine) may identify two available compression algorithms, and a workload on the lcs 702 may select one of those compression algorithms via modifications to the provided-resource file hierarchy 1000*a* as discussed above. As such, one of skill in the art in possession of the present disclosure will appreciate how the specific example of the provided-resource file hierarchy 1000*a* illustrated in FIG. 10B identifies (at a high level) two types of management capabilities for the lcs-provided-resources: one that directly pertains to the configuration of the lcs 702 (e.g., cpus, memory, power, etc.), and another that is related to devices/resources provided in addition to the configuration of the lcs 702 (e.g., accelerators, lcs-specific operation profiles, etc.) However, one of skill in the art in possession of the present disclosure will appreciate how provided-resource file hierarchies may be configured in other manners that will fall within the scope of the present disclosure as well.

As discussed above, any provided resource device identified to the resource device management subsystem 706 may include attributes and operating information generated by the provided resource device(s) in response to its utilization by the LCS 702 and/or the workload 704, and thus one of skill in the art in possession of the present disclosure will appreciate how the provided-resource file hierarchy 1000*a* may also identify attributes and operating information for any of the provided resource devices identified therein. For example, the processing systems, memory systems, PCIe systems, power systems, software systems, and/or other systems identified in the provided-resource file hierarchy 1000*a* may include branches that may provide the corresponding attributes and operating information that was generated by those system(s) and identified to the resource device management subsystem 706 at block 802*a*. However, while a specific provided-resource file hierarchy 1000*a* has been illustrated and described herein, one of skill in the art in possession of the present disclosure will appreciate how the resource devices currently providing the LCS 702 and/or provided for the workload 704 (as well as attributes and operating information for such resource devices) may be presented to the workload 704 in a variety of manners that will fall within the scope of the present disclosure as well.

Figure 11A:
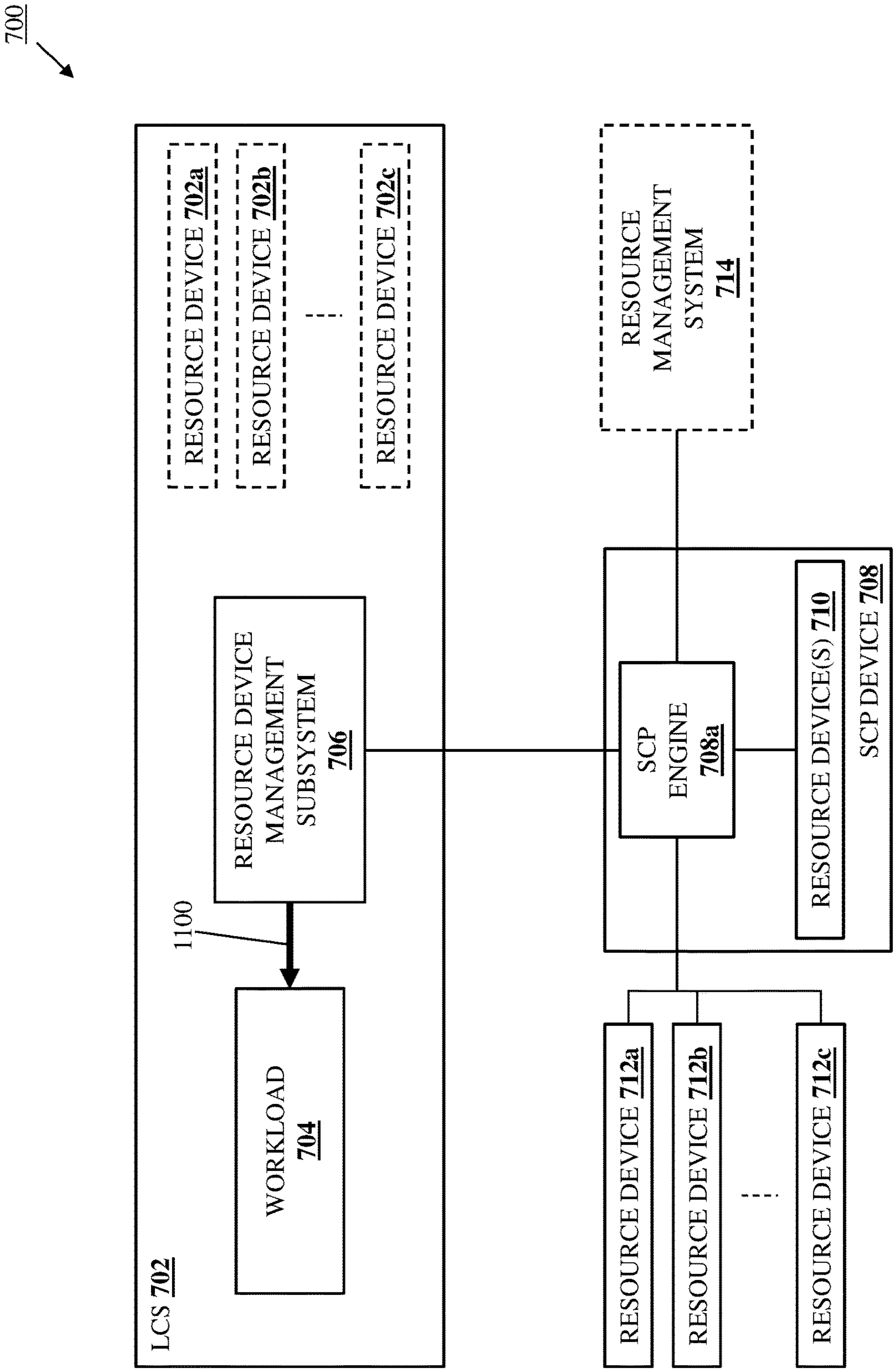
FIG. 11A is a schematic view illustrating an embodiment of the LCS workload in-band resource device management system of FIG. 7 operating during the method of FIG. 8.

With reference to FIG. 11A, in an embodiment of block 804*b*, the resource device management subsystem 706 may perform available-resource file hierarchy presentation operations 1100 that may include generating an available-resource file hierarchy that identifies the available resource devices that were determined at block 802*b*, attributes of those available resource devices, operating information about those available resource devices, and/or any other available resource device information that would be apparent to one of skill in the art in possession of the present disclosure, and presenting the available-resource file hierarchy to the workload 704. As such, some embodiments of block 804*b* may allow resource devices, which are not being provided to an LCS and that may be local or remote with respect to the LCS 702 (while appearing to be local to the LCS 702 via the SCP device 708), to be identified to the workload 704.

Figure 11B:
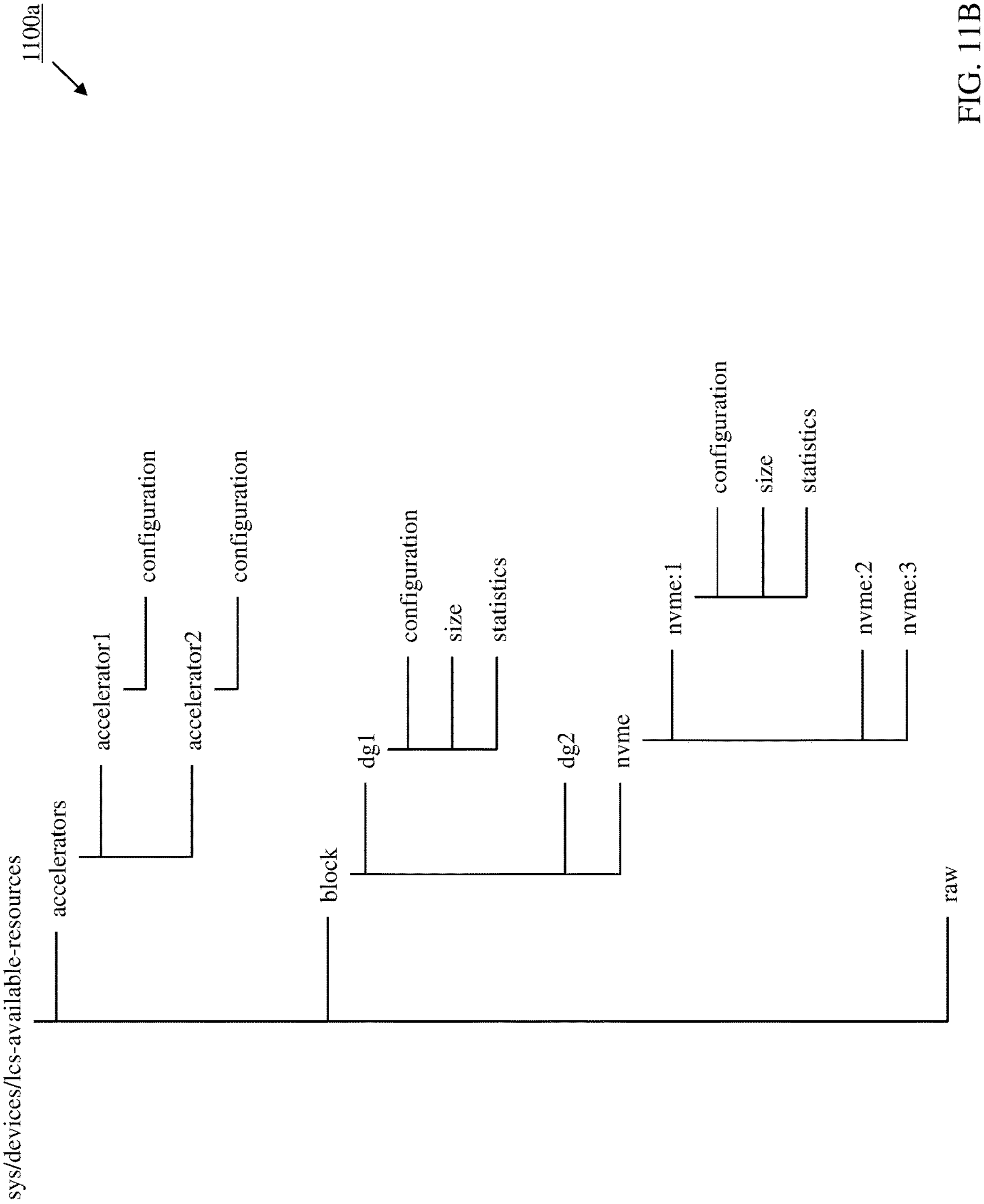
FIG. 11B is a tree-structure view illustrating an embodiment of an available-resource file hierarchy that may be utilized during the method of FIG. 8.

For example, with reference to FIG. 11B, an embodiment of an available-resource file hierarchy 1100*a* that may be presented to the workload 704 at block 804*b* is illustrated. As can be seen in FIG. 11B, the available-resource file hierarchy 1100*a* may be provided by a tree structure (e.g., a "virtual device tree") that is configured to identify resources available to LCSs (e.g., "sys/devices/lcs-available-resources" at the top of the provided-resource file hierarchy 1100*a*), with resources provided by accelerator systems (e.g., "accelerators"), storage systems (e.g., "block"), and other systems (e.g., "raw") identified in respective first branches of the tree structure. Furthermore, accelerator devices provided by the accelerator systems (e.g., "accelerator1" and "accelerator2") may be identified by second branches extending from the corresponding first branch of the tree structure, with third branches extending from each of those second branches identifying configurations (e.g., "configuration") for those accelerator devices. Similarly, storage devices provided by the storage systems (e.g., "dg1", "dg2", and "nvme") may be identified by second branches extending from the corresponding first branch of the tree structure. In the specific example illustrated in FIG. 11B, third branches extending from the second branch for a storage device (e.g., "dg1") may identify a configuration for that storage device (e.g., "configuration"), a size of that storage device (e.g., "size"), and statistics for that storage device (e.g., "statistics"). Furthermore, in the specific example illustrated in FIG. 11B, third branches extending from the second branch for storage devices (e.g., "nvme") may identify particular storage devices (e.g., "nvme:1", "nvme:2", and "nvme:3"), with fourth branches extending from the third branch for one of those storage devices (e.g., "nvme:1") identifying a configuration for that storage device (e.g., "configuration"), a size of that storage device (e.g., "size"), and statistics for that storage device (e.g., "statistics").

As will be appreciated by one of skill in the art in possession of the present disclosure, the available-resource file hierarchy 1000*b* provides for the hierarchical organization of available resources as files organized in a "tree" of files, and identifies resources that are available to a workload on an LCS (e.g., resources advertised by the SCPM or SCP device to the LCS). However, one of skill in the art in possession of the present disclosure will appreciate how a workload on the LCS may be unable to use such available resources until it requests them for provisioning, after which they may be identified in the provided-resource file hierarchy 1000*a* discussed above. In specific examples, a workload on the LCS may request available resources with a specific configuration using the available-resource file hierarchy 1000*b* and via the configuration files identified for those resources (e.g., system/devices/lcs-available-resources/accelerators/accelerator1/configuration file where, for example, an accelerator algorithm may be selected as described in the example above).

As discussed above, any available resource device identified to the resource device management subsystem 706 may include attributes and operating information generated by the available resource device(s) (e.g., by other LCSs and/or workloads), and thus one of skill in the art in possession of the present disclosure will appreciate how the available-resource file hierarchy 1100*a* may also identify attributes and operating information for any of the available resource devices identified therein. For example, the accelerator systems, storage systems, or other systems identified in the available-resource file hierarchy 1100*a* may include branches (e.g., the branches with statistics information in the illustrated embodiment) that may provide the corresponding attributes and operating information that was generated by those system(s) and identified to the resource device management subsystem 706 at block 802*b*. In some embodiments available resources that are currently provided to other LCSs may generate operating information that may then be provided to the LCS 702, while other embodiments may provide the LCS 702 with an abstracted view of available resources (with operating information for those available resources abstracted as well). However, while a specific available-resource file hierarchy 1100*a* has been illustrated and described herein, one of skill in the art in possession of the present disclosure will appreciate how the resource devices currently providing the LCS 702 and/or provided for the workload 704 (as well as attributes and operating information for such resource devices) may be presented to the workload 704 in a variety of manners that will fall within the scope of the present disclosure as well.

The method 800 then proceeds to decision block 806 where it is determined whether a resource device request is received from the workload. As will be appreciated by one of skill in the art in possession of the present disclosure, the workload 704 provided using the LCS 702 (e.g., by an operating system and/or applications provided using that LCS 702) may be configured to request resource device(s) identified in the available-resource file hierarchy in the event the resources provided by the resource device(s) are needed by that workload 704. Furthermore, while not illustrated in FIG. 8, as discussed below the workload 704 may be configured to modify resource device(s) identified in the provided-resource file hierarchy in the event the resource requirements of the workload 704 change.

As will be appreciated by one of skill in the art in possession of the present disclosure, the operating system and/or application that provides the workload 704 may be configured to perform conventional Input/Output Control (IOCTL) operations (e.g., system calls for device-specific Input/Output operations and/or other operations that are not expressed by regular system calls), as well as how the provided-resource file hierarchy and the available-resource file hierarchy described above may present a unified view of resource devices provided to/available to the operating systems and/or applications in order to allow such operating systems and/or applications to perform the resource device requests using the available-resource file hierarchy (as well as the resource device modifications discussed above using the provided-resource file hierarchy) and via file-based I/O calls, and without the need for substantial modification to those operating systems and/or applications. As such, in an embodiment of decision block 806, the resource device management subsystem 706 may monitor to determine whether a resource device request has been received from the workload 704.

If, at decision block 806, it is determined that no resource device request is received from the workload, the method 800 returns to blocks 802*a* and 802*b*. For example, at decision block 806 the resource devices 702*a*-702*c* may be satisfying the resource requirements of the workload 704 such that the workload 704 does not generate a resource device request based on the available resource devices identified in the available-resource device hierarchy being presented to it by the resource device management subsystem 706, and thus the resource device management subsystem 706 will determine that no resource device request has been received from the workload 704. As such, the method 800 may loop such that the resource device management subsystem 706 determines the provided resource devices and available resources devices at blocks 802*a*/802*b* as discussed above, and presents the workload 704 with the provided-resource device hierarchy and available-resource device hierarchy at blocks 804*a*/804*b* as discussed above, until a resource device request is received from the workload 704. Thus, one of skill in the art in possession of the present disclosure will appreciate how the provided-resource device hierarchy and available-resource device hierarchy discussed above may be continuously or periodically updated such that the most current provided resource devices and available resource devices are identified to the workload 704.

Figure 12:
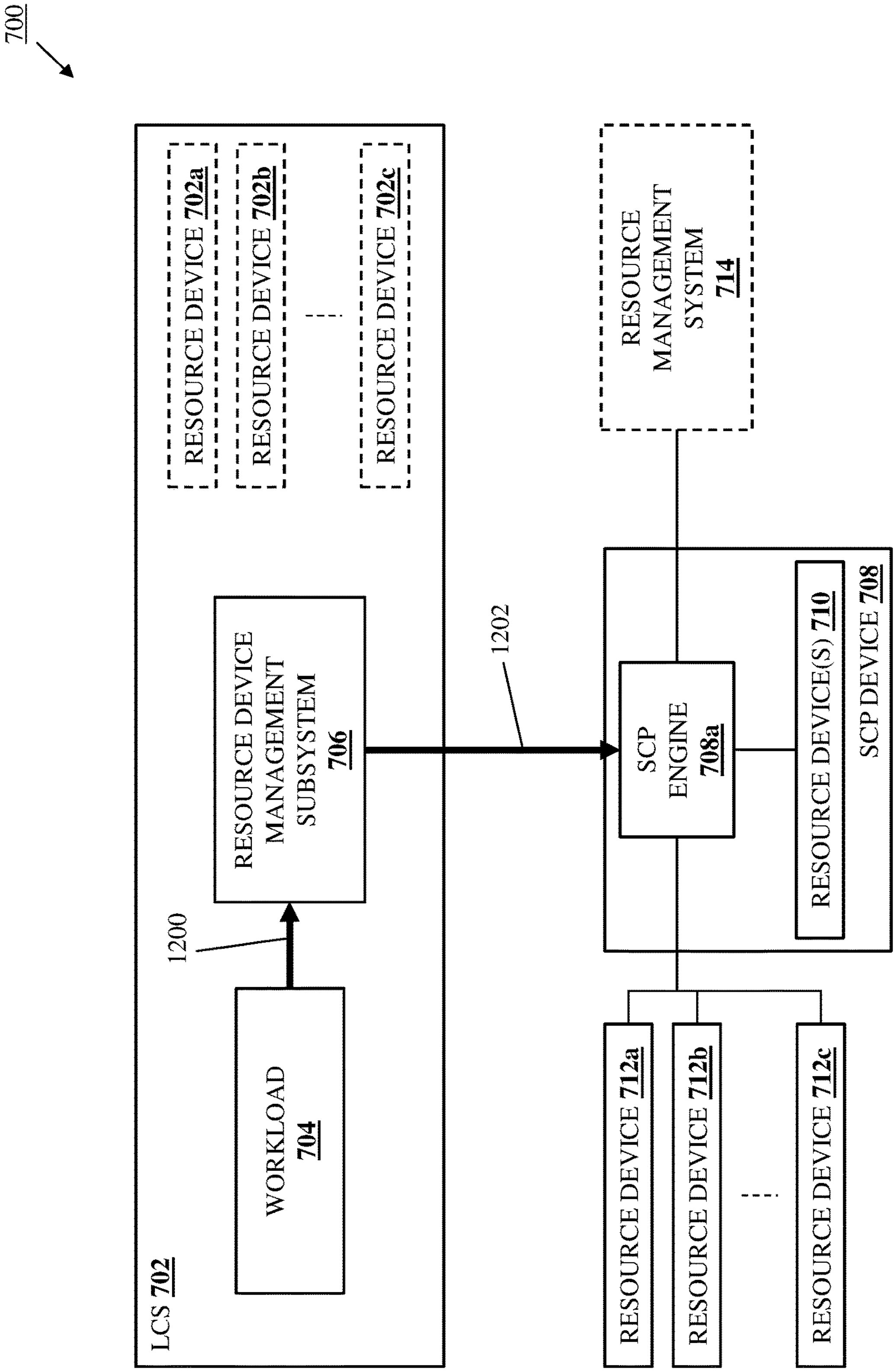
FIG. 12 is a schematic view illustrating an embodiment of the LCS workload in-band resource device management system of FIG. 7 operating during the method of FIG. 8.

If at decision block 806, it is determined that a resource device request is received from the workload, the method 800 proceeds to block 808 where the resource device management subsystem provides the SCP device a resource device provisioning request that causes the SCP device to provide resource device(s) identified in the resource device request to the LCS for utilization by the workload. With reference to FIG. 12, in an embodiment of decision block 806, the resource devices 702*a*-702*c* may not be satisfying the resource requirements of the workload 704 such that the workload 704 performs resource device request provisioning operations 1200 that includes providing a resource device request for available-resource device(s) identified in the available-resource device hierarchy (e.g., the resource devices 710 an 712*b* in the examples below) to the resource management subsystem 706 such that the resource device management subsystem 706 determines that a resource device request has been received from the workload 704. For example, as discussed above, the provisioning of the resource device request may include the operating system and/or application that is providing the workload 704 performing IOCTL operations, file-based I/O operations, and/or other operations using the available-resource device hierarchy that would be apparent to one of skill in the art in possession of the present disclosure in order to identify a resource device being requested from those identified in the available-resource device hierarchy.

Figure 13:
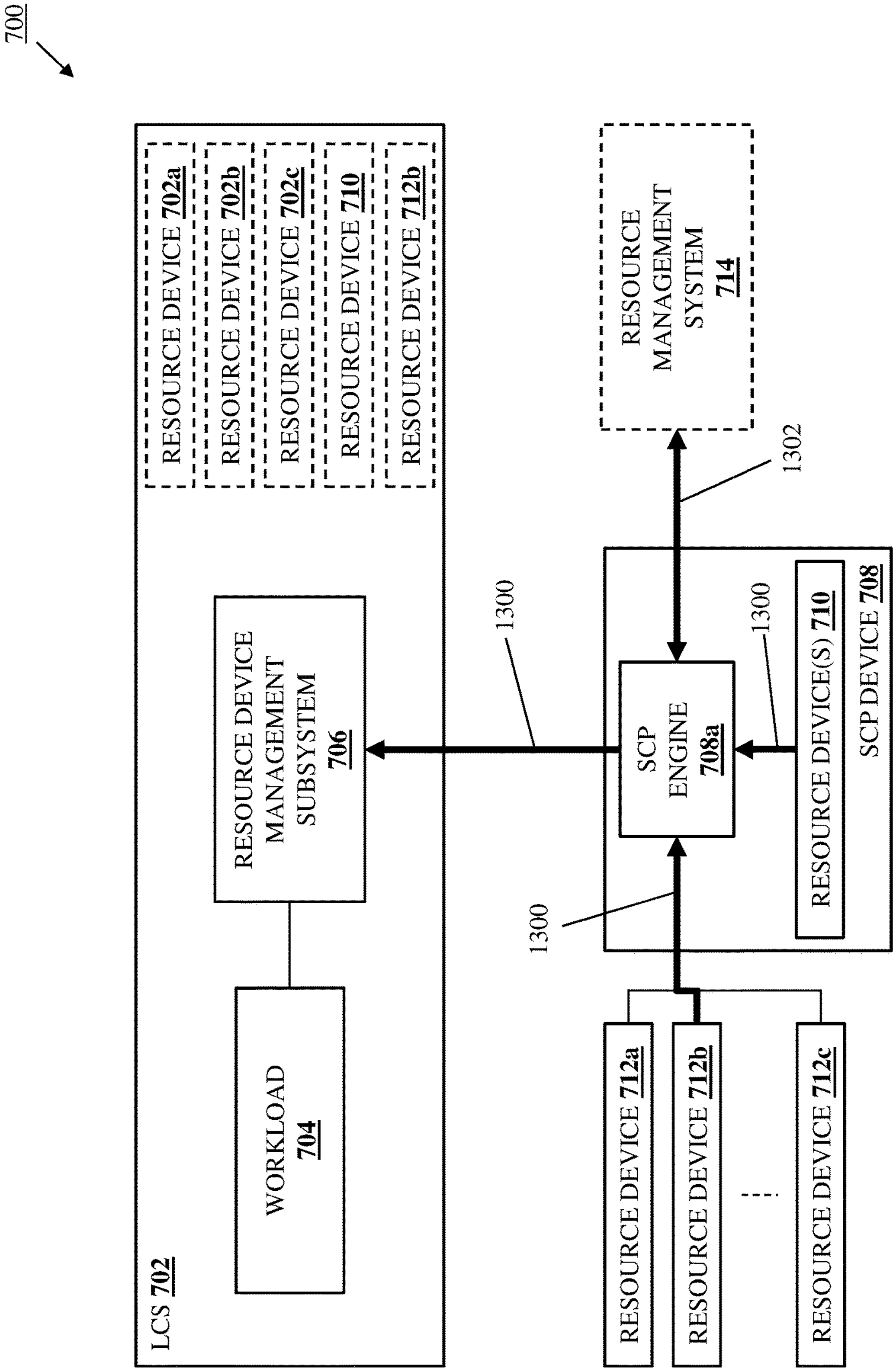
FIG. 13 is a schematic view illustrating an embodiment of the LCS workload in-band resource device management system of FIG. 7 operating during the method of FIG. 8.

With continued reference to FIG. 12, at block 808 and in response to receiving the resource request from the workload 704, the resource device management subsystem 706 may perform resource device provisioning request transmission operations 1202 that include transmitting a resource device provisioning request to the SCP device 708 such that it is received by the SCP engine 708*a*. With reference to FIG. 13, at block 808 and in response to the receiving the resource device request, the SCP engine 708*a* in the device 708 may perform resource device provisioning operations 1300 in order to provide the resource devices 710 and 712*a* that were included in the resource device request to the LCS 702 and/or for utilization by the workload 704, which is illustrated in FIG. 13 via the inclusion of the resource devices 710 and 712*b* with the resource devices 702*a*-702*c* that are providing the LCS 702. As illustrated in FIG. 13, in some embodiments, the SCP engine 708*a* in the SCP device 708 may perform LCS resource device synchronization operations 1302 in order to synchronize the resource device composition of the LCS 702 with the resource management system 714 in order to ensure that the composition of the resource devices that provide the LCS 702 and that are identified in the resource management system 714 includes the resource devices 710 and 712*b* that are now being provided to the LCS 702 and/or workload 704 by the SCP device 708*a*.

As will be appreciated by one of skill in the art in possession of the present disclosure, following block 808, the workload 704 may utilize any resource devices that were provided to the LCS 702. The method 800 may then return to blocks 802*a* and 802*b*. As such, the method 800 may loop such that the resource device management subsystem 706 continuously/periodically updates the provided resource devices and available resources devices at blocks 802*a*/802*b* as discussed above, presents the workload 704 with provided-resource device hierarchy and available-resource device hierarchy as discussed above, and when a resource device request is received from the workload 704, causes the SCP device to provide the requested resource devices to the LCS 702 for utilization by the workload 704. Thus, one of skill in the art in possession of the present disclosure will appreciate how the method 800 provides in-band techniques for operating systems and/or applications providing a workload on an LCS to perform operating-system-driven/application-driven resource device management without the need for the operating systems or applications to be configured to communicate directly with a resource management system such as the SCPM device discussed above.

As discussed above, while not illustrated in FIG. 8, the workload 704 may be configured to modify resource device(s) identified in the provided-resource file hierarchy in the event the resource requirements of the workload 704 change. For example, the operating system and/or applications that provide the workload 704 may perform the resource device modifications using the provided-resource file hierarchy discussed above in order to configure any resource device attributes that define the operation of the LCS 702 and/or the workload 704, including the configuration of processing system hyperthreading, the configuration of power system power profile settings, the configuration of memory system attributes, processing system attributes, storage system attributes, networking system attributes, and/or other system attributes, as well as any other configuration operations that would be apparent to one of skill in the art in possession of the present disclosure.

Figure 14:
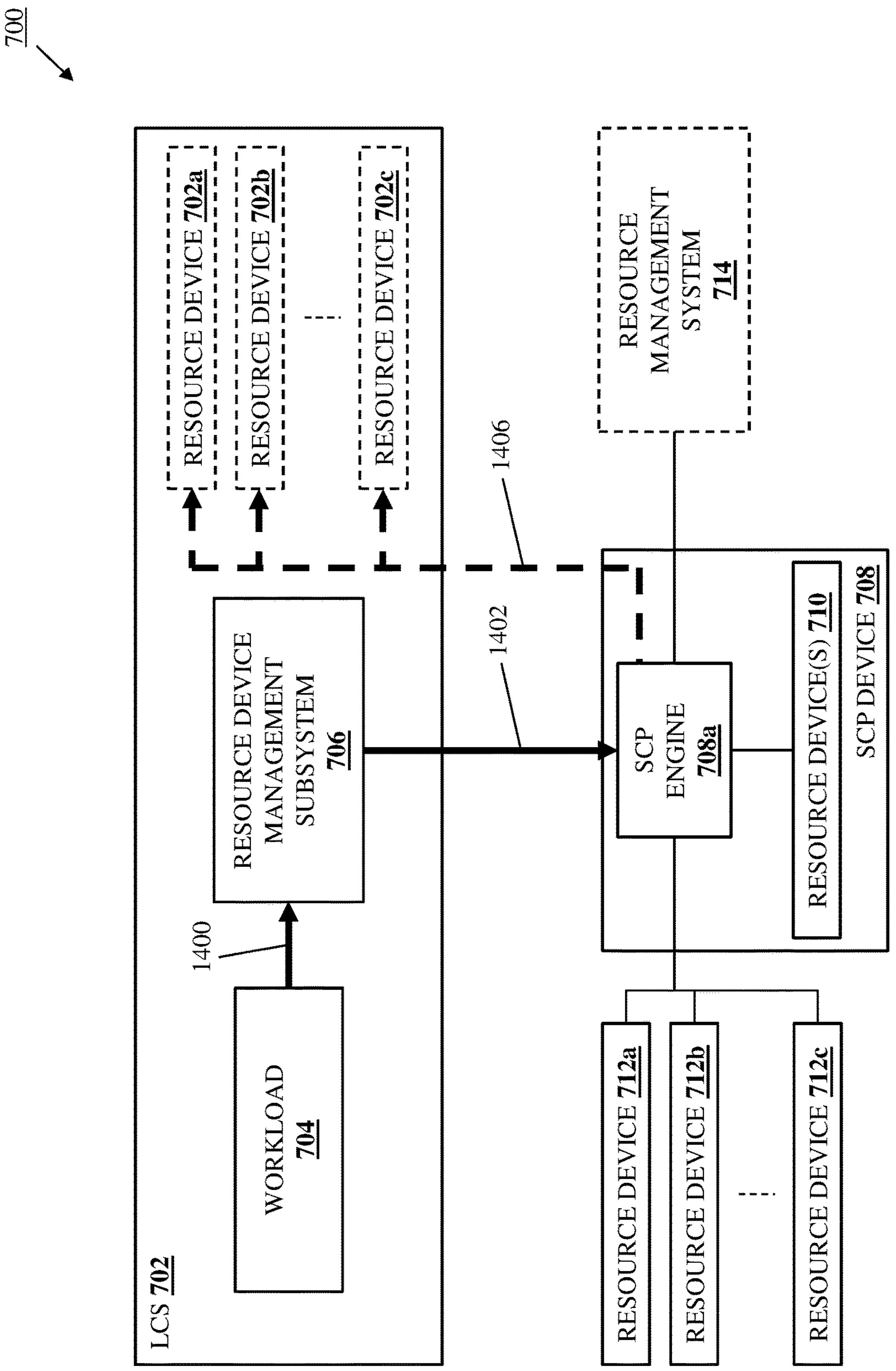
FIG. 14 is a schematic view illustrating an embodiment of the LCS workload in-band resource device management system of FIG. 7 operating to perform additional functionality not identified in the method of FIG. 8.

For example, with reference to FIG. 14, the operating system and/or application that provides the workload 704 may perform resource device modification request provisioning operations 1400 that may include performing IOCTL operations, file-based I/O operations, and/or other operations using the provided-resource device hierarchy that would be apparent to one of skill in the art in possession of the present disclosure in order to provide a resource device modification request to the resource device management subsystem 706 to modify a resource device that is identified in the provided-resource device hierarchy. In response to receiving the resource device modification request, the resource device management subsystem 706 may perform resource device modification instruction provisioning operations 1402 that include providing a resource device modification instruction to the SCP engine 708*a* in the SCP device 708. In response to receiving the resource device modification instruction, the SCP engine 708*a* in the SCP device 708 may perform resource device modifications operations 1406 to modify any of the resource devices 702*a*-702*c* that are being used to provide the LCS 702 and/or that are provided for utilization by the workload 704 in the example illustrated in FIG. 14. Thus, as described above, resource devices being used to provide an LCS may be modified by a workload to configure processing system attributes (e.g., hyperthreading), power system attributes (e.g., power profiles), memory system attributes, storage system attributes, network attributes, and/or other resource device attributes that would be apparent to one of skill in the art in possession of the present disclosure. In a specific example, the resource device modifications discussed above may provide for the setting of time-based access to the LCS 702, Quality of Service (QoS)-based access to the LCS 708, and/or any other resource device modifications that would be apparent to one of skill in the art in possession of the present disclosure.

Thus, systems and methods have been described that provide for the identification of available and provisioned resource devices to a workload on an LCS, as well as the enablement of in-band management of those resource devices by the workload. For example, the LCS workload in-band resource device management system of the present disclosure may include a resource device management subsystem coupled to a workload that is provided using an LCS, and to a System Control Processor (SCP) device. The resource device management subsystem determines a first plurality of resource devices that are available via the SCP device for the LCS, and presents an available-resource file hierarchy to the workload that identifies the first plurality of resource devices. When the resource device management subsystem receives a resource device request from the workload for a first resource device that is included in the first plurality of resource devices identified in the available-resource file hierarchy, it provides a resource device provisioning request to the SCP device that is configured to cause the SCP device to provide the first resource device to the LCS for utilization by the workload. As such, the workload on the LCS may utilize in-band communications to request available resource devices in order to be provided those available resource device as its resource requirements change, thus allowing workloads to programmatically map resource devices to their changing resource requirements to, for example, improve resource utilization, reduce resource latency, and/or perform other operations to meet the demands of the workload.

As such, embodiments of the present disclosure enable a resource management function for workloads in LCSs that is native to the operation of those workloads, and which may be implemented as an operating system/resource function in the form of the provided-resources file hierarchy and available-resources file hierarchy discussed above, which one of skill in the art in possession of the present disclosure will appreciate are configured to operate similarly to device management via UNIX operating systems. As such, the provided-resources file hierarchy may identify resources that are being provided for use by a workload in the LCS, and the available-resources file hierarchy may identify resources that are available to the LCS (e.g., advertised by an SCP/SCPM device) but not provided for use by the workload in the LCS. As such, the workload in the LCS may be required to request resources identified in the available-resources file hierarchy before being able to use them, at which point those resources may be identified in the provided-resources file hierarchy and provided for use by the workload. As discussed above, the available-resources file hierarchy may be configured to allow a workload in an LCS to request available resources with a particular configuration in order to have the resource with that configuration identified in the provided-resources file hierarchy and provided for use by that workload.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Logically Composed System (LCS) workload in-band resource device management system, comprising:

a resource management system;

a System Control Processor (SCP) device that is separate from and coupled to the resource management system, and that includes at least one first hardware processor that is configured to execute instructions to provide an SCP engine; and a Logically Composed System (LCS) that is separate from the resource management system and the SCP device, and that was initially composed by the resource management system using a first plurality of resource devices that provide a first resource device composition, wherein the LCS uses the first plurality of resource devices that include at least one second hardware processor to perform a workload within the LCS, wherein the LCS includes;

a resource device management subsystem that is provided using the at least one second hardware processor included in the first plurality of resource devices, that couples the LCS to the SCP engine in the SCP device, and that is configured to:

determine a second plurality of resource devices that are available via the SCP device for the LCS but that are not included in the first plurality of resource devices that are being used by the LCS to perform the workload;

present, to the workload, an available-resource file hierarchy that identifies the second plurality of resource devices;

receive, directly from the workload without communication between the workload and the resource management system that initially composed the LCS, a resource device request generated by the workload in response to a change in resource requirements for the workload using an entry in the available-resource file hierarchy that corresponds to a first resource device included in the second plurality of resource devices; and provide, to the SCP engine in the SCP device in response to receiving the resource device request, a resource device provisioning request that is configured to cause the SCP engine to modify a resource device composition of the LCS from the first resource device composition that includes the first plurality of resource devices to a second resource device composition that includes the first plurality of resource devices and the first resource device, wherein the LCS uses the first plurality of resource devices and the first resource device to perform the workload by:

performing one or more workload operations to meet demands of the workload using resource device functionality that is available from the first resource device and that is not available from the first plurality of resource devices.

2. The system of claim 1, wherein the resource device management subsystem provides a resource device driver.

3. The system of claim 1, wherein the resource device management subsystem is configured to:

provide, to the workload, operating information about at least one of the first plurality of resource devices.

4. The system of claim 1, wherein the resource device management subsystem is configured to:

determine a third plurality of resource devices that are provided by the SCP device to the LCS for utilization by the workload; and present, to the workload, a provided-resource file hierarchy that identifies the third plurality of resource devices.

5. The system of claim 4, wherein the resource device management subsystem is configured to:

provide, to the workload, operating information about at least one of the third plurality of resource devices.

6. The system of claim 4, wherein the resource device management subsystem is configured to:

configure, using the provided-resource file hierarchy, an attribute of at least one of the third plurality of resource devices.

7. An Information Handling System (IHS), comprising:

a hardware processing system that is included in a first plurality of resource devices that provide a first resource device composition used by a resource management system to initially compose a Logically Composed System (LCS), wherein the resource management system is separate from the LCS; and a memory system that is coupled to the hardware processing system and that includes instructions that, when executed by the hardware processing system, cause the hardware processing system to provide a resource device management engine that is included in the LCS and that is configured to:

determine a second plurality of resource devices that are available for the LCS via a System Control Processor (SCP) device that is separate from and coupled to the resource management system and the LCS and that includes at least one hardware processor that is configured to execute instructions to provide an SCP engine that is coupled to the LCS, wherein the LCS uses the first plurality of resource devices that include the hardware processing system to perform a workload within the LCS, and the second plurality of resource devices are not included in the first plurality of resource devices that are being used by the LCS to perform the workload;

present, to the workload, an available-resource file hierarchy that identifies the second plurality of resource devices;

receive, directly from the workload without communication between the workload and the resource management system that initially composed the LCS, a resource device request generated by the workload in response to a change in resource requirements for the workload using an entry in the available-resource file hierarchy that corresponds to a first resource device that is included in the second plurality of resource devices; and provide, to the SCP engine in the SCP device in response to receiving the resource device request, a resource device provisioning request that is configured to cause the SCP engine to modify a resource device composition of the LCS from the first resource device composition that includes the first plurality of resource devices to a second resource device composition that includes the first plurality of resource devices and the first resource device, wherein the LCS uses the first plurality of resource devices and the first resource device to perform the workload by:

performing one or more workload operations to meet demands of the workload using resource device functionality that is available from the first resource device and that is not available from the first plurality of resource devices.

8. The IHS of claim 7, wherein the resource device management engine provides a resource device driver.

9. The IHS of claim 7, wherein the resource device management engine is configured to:

provide, to the workload, operating information about at least one of the first plurality of resource devices.

10. The IHS of claim 7, wherein the resource device management engine is configured to:

determine a third plurality of resource devices that are provided by the SCP device to the LCS for utilization by the workload; and present, to the workload, a provided-resource file hierarchy that identifies the third plurality of resource devices.

11. The IHS of claim 10, wherein the resource device management engine is configured to:

provide, to the workload, operating information about at least one of the third plurality of resource devices.

12. The IHS of claim 10, wherein the resource device management engine is configured to:

configure, using the provided-resource file hierarchy, an attribute of at least one of the third plurality of resource devices.

13. The IHS of claim 7, wherein the workload is provided by at least one of an operating system or an application running on the LCS.

14. A method for in-band management of resource devices by a workload provided on a Logically Composed System (LCS), comprising:

determining, by a resource device management subsystem using at least one first hardware processor that is included in a first plurality of resource devices that provide a first resource device composition used by a resource management system to initially compose the LCS, a second plurality of resource devices that are available for the LCS via a System Control Processor (SCP) device that is separate from and coupled to the resource management system and the LCS and that includes at least one second hardware processor that is configured to execute instructions to provide an SCP engine that is coupled to the LCS, wherein the LCS is separate from the resource management system and uses the first plurality of resource devices including the at least one first hardware processor to perform the workload within the LCS, and the second plurality of resource devices are not included in the first plurality of resource devices that are being used by the LCS to perform the workload;

presenting, by the resource device management subsystem to the workload using the at least one first hardware processor, an available-resource file hierarchy that identifies the second plurality of resource devices;

receiving, by the resource device management subsystem directly from the workload using the at least one first hardware processor and without communication between the workload and the resource management system that initially composed the LCS, a resource device request generated by the workload in response to a change in resource requirements for the workload using an entry in the available-resource file hierarchy that corresponds to a first resource device that is included in the second plurality of resource devices;

providing, by the resource device management subsystem to the SCP engine in the SCP device using the at least one first hardware processor, a resource device provisioning request that is configured to cause the SCP engine to modify a resource device composition of the LCS from the first resource device composition that includes the first plurality of resource devices to a second resource device composition that includes the first plurality of resource devices and the first resource device; and performing, by the LCS using the first plurality of resource devices and the first resource device, the workload by:

performing one or more workload operations to meet demands of the workload using resource device functionality that is available from the first resource device and that is not available from the first plurality of resource devices.

15. The method of claim 14, wherein the at least one first hardware processor in the resource device management subsystem provides a resource device driver.

16. The method of claim 14, further comprising:

providing, by the at least one first hardware processor in the resource device management subsystem to the workload, operating information about at least one of the first plurality of resource devices.

17. The method of claim 14, further comprising:

determining, by the at least one first hardware processor in the resource device management subsystem, a third plurality of resource devices that are provided by the SCP device to the LCS for utilization by the workload; and presenting, by the at least one first hardware processor in the resource device management subsystem to the workload, a provided-resource file hierarchy that identifies the third plurality of resource devices.

18. The method of claim 17, further comprising:

providing, by the at least one first hardware processor in the resource device management subsystem to the workload, operating information about at least one of the third plurality of resource devices.

19. The method of claim 17, further comprising:

configuring, by the at least one first hardware processor in the resource device management subsystem using the provided-resource file hierarchy, an attribute of at least one of the third plurality of resource devices.

20. The method of claim 14, wherein the workload is provided by at least one of an operating system or an application running on the LCS.

* * * * *